United States Patent
Harada et al.

(10) Patent No.: US 10,386,567 B2
(45) Date of Patent: Aug. 20, 2019

(54) OPTICAL SHEET FOR LIQUID CRYSTAL DISPLAY DEVICE, BACKLIGHT UNIT FOR LIQUID CRYSTAL DISPLAY DEVICE AND PRODUCTION METHOD OF OPTICAL SHEET FOR LIQUID CRYSTAL DISPLAY DEVICE

(71) Applicant: KEIWA INC., Tokyo (JP)

(72) Inventors: Kenichi Harada, Tokyo (JP);
Yoshitada Namikawa, Tokyo (JP);
Tadayoshi Fukuda, Tokyo (JP); Yuki Matsuno, Tokyo (JP)

(73) Assignee: Keiwa Inc., Tokyo (JP)

( * ) Notice: Subject to any disclaimer, the term of this patent is extended or adjusted under 35 U.S.C. 154(b) by 0 days.

(21) Appl. No.: 15/595,445

(22) Filed: May 15, 2017

(65) Prior Publication Data

US 2017/0329066 A1    Nov. 16, 2017

(30) Foreign Application Priority Data

May 16, 2016  (JP) ................................. 2016-098290
Apr. 19, 2017  (JP) ................................. 2017-083197

(51) Int. Cl.
*F21V 8/00*     (2006.01)
*G02B 5/18*     (2006.01)

(52) U.S. Cl.
CPC .............. *G02B 6/005* (2013.01); *G02B 5/18* (2013.01); *G02B 6/0068* (2013.01)

(58) Field of Classification Search
CPC ........... B29C 59/02; G02B 1/11; G02B 1/118; G02B 17/006; G02B 3/005; G02B 5/003; G02B 5/02; G02B 5/0215; G02B 5/045; G02B 6/005; G02B 6/0065; G02B 6/0068; G02F 1/133524; G02F 2001/133607

See application file for complete search history.

(56) References Cited

U.S. PATENT DOCUMENTS 6,417,831 B2 *  7/2002  Kashima .................. F21S 8/00
                                              345/102
6,570,710 B1 *  5/2003  Nilsen ...................... G02B 1/11
                                              359/625

(Continued)

FOREIGN PATENT DOCUMENTS

CN    101630030 A    1/2010
CN    102308232 A    1/2012

(Continued)

*Primary Examiner* — Robert J May
(74) *Attorney, Agent, or Firm* — Norris McLaughlin, P.A.

(57) ABSTRACT

An optical sheet for a liquid crystal display device includes a plurality of protruding portions provided scatteredly on a back face, in which the protruding portions each have a flattened semi-spherical shape or a flattened conical shape with a rounded apex. The protruding portions may each have a half spheroidal shape. An occupancy area ratio of the plurality of protruding portions may be no less than 2% and no greater than 80%. An average diameter of the protruding portions may be no less than 5 μm and no greater than 60 μm, and an average height of the protruding portions may be no less than 0.5 μm. A diffraction grating shape with multiple rows that are oriented in a single direction on the back face in a region where the plurality of protruding portions are absent.

11 Claims, 10 Drawing Sheets

(56) References Cited

U.S. PATENT DOCUMENTS

| | | | | |
|---|---|---|---|---|
| 7,034,808 B2* | 4/2006 | Sakata | .................. | G06F 3/044 |
| | | | | 345/173 |
| 7,142,361 B2* | 11/2006 | Olofson | ............. | C08F 290/067 |
| | | | | 359/452 |
| 7,297,386 B2* | 11/2007 | Suzuki | ................... | B29C 59/02 |
| | | | | 313/461 |
| 8,870,432 B2* | 10/2014 | Wu | ...................... | G02B 6/0036 |
| | | | | 362/606 |
| 9,869,809 B2* | 1/2018 | Kashima | ............. | G02B 6/0056 |
| 2003/0156233 A1* | 8/2003 | Ohsumi | ............. | G02B 6/0038 |
| | | | | 349/65 |
| 2003/0174518 A1* | 9/2003 | Toshima | .............. | G02B 6/0051 |
| | | | | 362/558 |
| 2006/0139749 A1* | 6/2006 | Watanabe | ............ | G02B 17/006 |
| | | | | 359/460 |
| 2006/0250064 A1* | 11/2006 | Park | ....................... | G02B 3/005 |
| | | | | 313/112 |
| 2007/0121029 A1* | 5/2007 | Fukuda | ................ | G02B 6/0056 |
| | | | | 349/64 |
| 2007/0242199 A1* | 10/2007 | Harada | ............... | G02F 1/133528 |
| | | | | 349/117 |
| 2008/0123028 A1* | 5/2008 | Harada | .................. | G02B 6/0056 |
| | | | | 349/96 |
| 2008/0129183 A1* | 6/2008 | Egi | ......................... | H01J 11/12 |
| | | | | 313/483 |
| 2008/0138579 A1* | 6/2008 | Hsu | ................... | B29D 11/0074 |
| | | | | 428/148 |
| 2008/0144180 A1* | 6/2008 | Nishida | .................... | H01J 11/12 |
| | | | | 359/601 |
| 2009/0122577 A1* | 5/2009 | Wu | ...................... | G02B 5/0215 |
| | | | | 362/627 |
| 2010/0002306 A1* | 1/2010 | Goto | ...................... | G02B 5/003 |
| | | | | 359/613 |
| 2010/0046200 A1* | 2/2010 | Kuo | ..................... | G02B 5/0252 |
| | | | | 362/97.1 |
| 2011/0128629 A1 | 6/2011 | Takahashi et al. | | |
| 2011/0235181 A1* | 9/2011 | Hayashibe | ............. | G02B 1/118 |
| | | | | 359/577 |
| 2012/0138342 A1* | 6/2012 | Muramoto | ........... | G06F 3/0412 |
| | | | | 174/254 |
| 2013/0294108 A1 | 11/2013 | Hu et al. | | |
| 2014/0220306 A1* | 8/2014 | Uchida | ............... | B29C 37/0053 |
| | | | | 428/172 |
| 2015/0177427 A1* | 6/2015 | Morinaka | ........... | H01L 51/5268 |
| | | | | 362/355 |
| 2016/0172631 A1* | 6/2016 | Yamada | .............. | H01L 51/5275 |
| | | | | 428/156 |

FOREIGN PATENT DOCUMENTS

| | | | | |
|---|---|---|---|---|
| CN | 102640019 A | 8/2012 | | |
| CN | 104865624 A | 8/2015 | | |
| CN | 105319761 A | 2/2016 | | |
| JP | 10106327 A * | 4/1998 | | |
| JP | WO 2008020514 A1 * | 2/2008 | ............ | G02B 5/045 |
| JP | 2010-026231 A | 2/2010 | | |
| JP | 2011-13355 | 7/2011 | | |
| JP | 2011-133555 | 7/2011 | | |
| JP | 2011-170180 | 9/2011 | | |
| JP | 2012-226290 A | 11/2012 | | |
| JP | 20160011206 A | 1/2016 | | |
| KR | 20160011206 A | 1/2016 | | |
| TW | 201129818 | 9/2011 | | |
| TW | 201346392 | 11/2013 | | |

* cited by examiner

OPTICAL SHEET FOR LIQUID CRYSTAL DISPLAY DEVICE, BACKLIGHT UNIT FOR LIQUID CRYSTAL DISPLAY DEVICE AND PRODUCTION METHOD OF OPTICAL SHEET FOR LIQUID CRYSTAL DISPLAY DEVICE

BACKGROUND OF THE INVENTION

The present invention relates to an optical sheet for a liquid crystal display device, a backlight unit for a liquid crystal display device, and a production method of an optical sheet for a liquid crystal display device.

DESCRIPTION OF THE RELATED ART

Backlight systems, which illuminate a liquid crystal layer from behind, are in widespread use as a transmissive liquid crystal display device, and the transmissive liquid crystal display device is equipped with an edge-lit (side-lit) backlight unit, an immediate beneath type backlight unit or the like on the back face side of the liquid crystal layer. The edge-lit backlight unit 101 is generally equipped with a light source 102, an optical waveguide sheet 103 in the form of a rectangular plate arranged with its edge aligned with the light source 102, and a plurality of optical sheets 104 superposed on the front face side of the optical waveguide sheet 103, as shown in FIG. 19. The optical sheet 104 has optical functions such as diffusion and refraction of the transmitted rays of light and the like, and as the optical sheet 104, for example a light diffusion sheet 105 which is disposed on the front face side of the optical waveguide plate 103 and primarily has a light diffusion function, and a prism sheet 106 which is disposed on the front face side of the light diffusion sheet 105 and has a refraction function toward a normal direction side, and the like are utilized.

With regard to the functions of the backlight unit 101, in brief; first, the rays of light entering the optical waveguide sheet 103 from the light source 102 are reflected on reflection dots or a reflection sheet (not shown in the Figure) on the back face of the optical waveguide sheet 103 as well as on each lateral face, and are emitted from the front face of the optical waveguide sheet 103. The rays of light emitted from the front face of the optical waveguide sheet 103 enter a light diffusion sheet 105, and are substantially uniformly diffused and emitted from its front face. The rays of light emitted from the front face of the light diffusion sheet 105 enter the prism sheet 106, are refracted by a plurality of protruding and streaking prism portions formed on the front face toward a normal direction and emitted, and illuminate the entire liquid crystal layer (not shown in the Figure) located further on the front face side. It is to be noted that, although not illustrated, as the optical sheet 104: a light diffusion sheet for use at the top that is disposed on the front face side of the prism sheet 106 and suppresses lack in uniformity of the luminance due to the shape, etc. of the plurality of protruding and streaking prism portions of the prism sheet 106 by slightly diffusing the rays of light; a micro lens sheet comprising a refraction function in a normal direction and a wide-angle light diffusion function; and the like are utilized.

The optical sheet 104 has optical functions such as diffusion and refraction of the transmitted rays of light as explained above, and is utilized for the purpose of achieving uniformity of the luminance, high luminance in the front direction, and the like, of the backlight unit. As an example of this optical sheet 104, the light diffusion sheet 105, as shown in FIG. 20, comprises a substrate layer 111 (optical layer) comprising a synthetic resin as a principal component, a light diffusion layer 112 overlaid on the front face side of the substrate layer 111, a sticking preventive layer 113 overlaid on the back face side of the substrate layer 111. The sticking preventive layer 113 prevents an inconvenience that moire occurs due to the back face of the light diffusion sheet 105 sticking (adhering) to the front face of the optical waveguide sheet 103. The sticking preventive layer 113 typically comprises spherical beads 114 and a binder 115 that covers the beads 114, and prevents sticking by protruding portions that protrude toward the back face side by virtue of the beads 114 (see Japanese Unexamined Patent Application, Publication No. 2010-26231).

However, since the conventional sticking preventive layer comprising the beads 114 and the binder 115 as described above has the protruding portions formed thereon by the beads 114 protruding, the protruding portions tend to be in a similar shape to that of the beads 114. Therefore, the average diameter and the average height of the protruding portions tend to be approximately equal, and thus, the radii R of the apexes (lower ends) of the protruding portions also tend to be small. For this reason, the conventional sticking preventive layer 113 may produce scuffs on the front face of the optical waveguide sheet 103 which abuts the protruding portions. The scuffs thus produced on the front face of the optical waveguide sheet 103 may lead to lack in uniformity of the luminance due to rays of light entering the scuffs.

PRIOR ART DOCUMENTS

Patent Documents

Patent Document 1: Japanese Unexamined Patent Application, Publication No. 2010-26231

SUMMARY OF THE INVENTION

The present invention was made in view of the foregoing circumstances, and an object of the present invention is to provide an optical sheet for a liquid crystal display device that is capable of preventing sticking and capable of preventing scuffs from being produced on other optical members disposed on the back face side, and a production method of the optical sheet for a liquid crystal display device. Another object of the present invention is to provide a backlight unit for a liquid crystal display device that is capable of preventing sticking and capable of preventing scuffs from being formed on an optical member.

According to an aspect of the present invention made for solving the aforementioned problems, an optical sheet for a liquid crystal display device comprises a plurality of protruding portions provided scatteredly on a back face of the optical sheet, wherein the protruding portions each have a flattened semi-spherical shape or a flattened conical shape with a rounded apex.

Due to comprising a plurality of protruding portions provided scatteredly on a back face, the optical sheet for a liquid crystal display device according to the aspect of the present invention partially abuts other optical members disposed on the back face side of the optical sheet for a liquid crystal display device, at the plurality of protruding portions. Therefore, according to the optical sheet for a liquid crystal display device of the aspect of the present invention, the prevention of sticking of the optical sheet with the other optical members disposed on the back face side of the optical sheet is enabled. Furthermore, according to the optical sheet for a liquid crystal display device of the aspect of the present invention, due to the protruding portions each having a flattened semi-spherical shape or a flattened conical shape with a rounded apex, the curved faces of the apexes (lower ends) of the plurality of protruding portions are comparatively smooth, whereby the prevention of scuffs on the front face of the other optical members disposed on the back face side is enabled.

The protruding portions each preferably have a half spheroidal shape. Due to the protruding portions each having the half spheroidal shape, the reliable prevention of scuffs on the front face of the other optical members disposed on the back face side of the optical sheet for a liquid crystal display device is enabled.

An occupancy area ratio of the plurality of protruding portions is preferably no less than 2% and no greater than 80%. When the occupancy area ratio of the plurality of protruding portions falls within the aforementioned range, the sufficient prevention of sticking with the other optical members disposed on the back face side is enabled, while more reliable prevention of scuffs on the front face of the other optical members is enabled.

An average diameter of the protruding portions is preferably no less than 5 µm and no greater than 60 µm, and an average height of the protruding portions is preferably no less than 0.5 µm. When the average diameter and the average height of the protruding portions fall within the aforementioned range, the reliable prevention of sticking with the other optical members disposed on the back face side of the optical sheet for a liquid crystal display device is enabled.

A diffraction grating shape with multiple rows that are oriented in a single direction is preferably provided on the back face in a region where the plurality of protruding portions are absent. When the diffraction grating shape with multiple rows that are oriented in a single direction is provided on the back face in a region where the plurality of protruding portions are absent, the diffusion of rays of light in the width direction of the diffraction grating shape is enabled, and the sufficient securing of the viewing angle in the width direction is enabled.

The diffraction grating shape preferably comprises scratch-like rows or hair-line-like rows arranged in a single direction. When the diffraction grating shape comprises scratch-like rows or hair-line-like rows arranged in a single direction, the easy and reliable diffusion of rays of light in the width direction of the diffraction grating shape is enabled.

A diffraction grating shape that is continuous with the diffraction grating shape is preferably provided also on a back face side of the plurality of protruding portions. When the diffraction grating shape that is continuous with the diffraction grating shape is provided also on a back face side of the plurality of protruding portions, the uniform diffusion of rays of light in the width direction of the diffraction grating shape is enabled, and the appropriate securing of the viewing angle in the width direction of the diffraction grating shape is enabled.

According to another aspect of the present invention made for solving the aforementioned problems, a backlight unit for a liquid crystal display device comprises: an optical waveguide sheet that guides rays of light entering from an end face toward a front face side; one or more LED light sources provided along the end face of the optical waveguide sheet; and one or more optical sheets superposed on the front face side of the optical waveguide sheet; wherein the optical sheet is used for at least one of the one or more optical sheets.

Due to comprising the optical sheet, the backlight unit for a liquid crystal display device according to the another aspect of the present invention enables, as described above, the prevention of sticking with the optical sheet and the other optical members disposed on the back face side of the optical sheet, and also the prevention of scuffs on the front face of the other optical members.

According to still another aspect of the present invention made for solving the aforementioned problems, a production method of an optical sheet for a liquid crystal display device comprising a plurality of protruding portions provided scatteredly on a back face of the optical sheet, comprises: conveying a strip-like resin film on a front face of a roller having on a front face, a reversed shape of a shape of the back face of the optical sheet provided with the plurality of protruding portions scatteredly; supplying an ultraviolet ray-curable resin composition between the resin film and the roller; and irradiating the ultraviolet ray-curable resin composition with an ultraviolet ray, wherein the protruding portions each have a flattened semi-spherical shape or a flattened conical shape with a rounded apex.

Due to using the roller having on the front face, the reversed shape of the plurality of protruding portions which are formed to each have a flattened semi-spherical shape or a flattened conical shape with a rounded apex, the production method of an optical sheet for a liquid crystal display device according to the still another aspect of the present invention enables the formation of protruding portions which are formed to each have a flattened semi-spherical shape or a flattened conical shape with a rounded apex on one lateral face of the resin film. Thus, the production method of an optical sheet for a liquid crystal display device of the still another aspect of the present invention enables the production of an optical sheet in which the prevention of sticking by partially abutting the other optical members by means of the plurality of protruding portions, and also the prevention of scuffs on the other optical members abutting the plurality of protruding portions.

It is to be noted that the term "front face side" as referred to means a viewer's side of a liquid crystal display device, and the term "back face side" as referred to means the opposite side thereof. The term "semi-spherical shape" as referred to means a concept including a "spherical cap" which means a three-dimensional shape cut off from a spherical shape by a plane, and specifically refers to a shape having a circular or elliptical bottom face and a spherical surface continuing from a circumferential edge of this bottom face. The term "conical shape" as referred to means a concept including a circular cone and a pyramid. The term "flattened half spheroidal shape" as referred to means a shape formed by halving a virtual spheroid obtained by rotating an ellipse about a short axis thereof, by a plane perpendicular to the short axis and including a long axis. The term "occupancy area ratio of the plurality of protruding portions" as referred to means a ratio of an occupancy area of the plurality of protruding portions to a plane area of a face on which the plurality of protruding portions are formed. The term "diameter" of each protruding portion as referred to means a diameter at the base, and the term "average diameter of the protruding portions" as referred to means an average of intermediate values between the maximum diameters and the minimum diameters of the bases of arbitrary ten protruding portions. The term "height" of each protruding portion as referred to means a length from the base to the projecting end of each protruding portion, and the term "average height of the protruding portions" as referred to means an average of lengths of arbitrary ten protruding portions from the base to the projecting end. The term "diffraction grating shape" as referred to is not limited to a shape of which optical properties are strictly adjusted, but means a shape that causes diffraction of incident light in a broad sense. The term "scratch-like rows or hair-line-like rows arranged in a single direction" as referred to means a shape in which multiple elongated scratches are formed so as to be oriented in a single direction. The term "flattened semi-spherical shape" as referred to means a shape of a semi-sphere or a spherical cap having a ratio of the height to the diameter of the bottom face of no greater than 0.5. The term "flattened conical shape" as referred to means a conical shape having a ratio of the height to an average diameter of the bottom face of no greater than 0.5. It is to be noted that the term "average diameter of the bottom face" as referred to means a diameter of a perfect circle having the same area as the bottom face.

As explained in the foregoing, the optical sheet for a liquid crystal display device of the aspect of the present invention enables the prevention of sticking, and the reliable prevention of scuffs from being produced on other optical members disposed on the back face side. The backlight unit for a liquid crystal display device of another aspect of the present invention enables the prevention of sticking, and the reliable prevention of scuffs from being formed on an optical member. Furthermore, the production method of an optical sheet for a liquid crystal display device of the still another aspect of the present invention enables the production of an optical sheet that is capable of preventing sticking and reliably preventing scuffs from being produced on other optical members disposed on the back face side.

Figure 1:
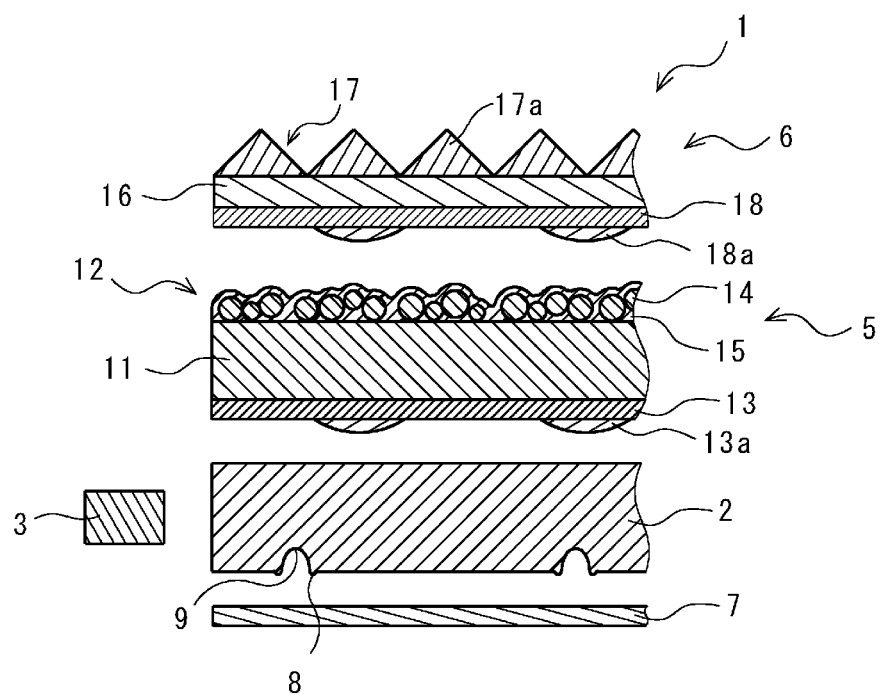
FIG. 1 is a schematic end view illustrating a backlight unit for a liquid crystal display device according to an embodiment of the present invention.

Hereinafter, embodiments of the present invention will be explained in more detail with references to the drawings, if necessary.

FIRST EMBODIMENT

Backlight Unit

A backlight unit for a liquid crystal display device 1 of FIG. 1 (hereinafter, may be also merely referred to as "backlight unit") is an edge-lit backlight unit, and is provided with a plurality of LED light sources. The backlight unit 1 comprises a light guide film 2 as an optical waveguide sheet that guides rays of light entering from an end face toward the front face side, a plurality of LED light sources 3 disposed along the end face of the light guide film 2, and a plurality of optical sheets for a liquid crystal display device (hereinafter, may be also merely referred to as "optical sheet") that are superposed on the front face side of the light guide film 2. The backlight unit 1 comprises, as the plurality of optical sheets, a light diffusion sheet 5 overlaid directly (without another sheet, etc. being interposed) on the front face of the light guide film 2, and a prism sheet 6 overlaid directly (without another sheet, etc. being interposed) on the front face of the light diffusion sheet 5. The backlight unit 1 further comprises a reflection sheet 7 disposed on the back face side of the light guide film 2. The light diffusion sheet 5 allows the rays of light entering from the back face side to diffuse and to be condensed in a normal direction (allowing the rays of light to be condensed and diffuse). The prism sheet 6 allows the rays of light entering from the back face side to be refracted in a normal direction. The reflection sheet 7 allows the rays of light exiting from the back face of the light guide film 2 to be reflected and to enter the light guide film 2 again. It is to be noted that although the reflection sheet 7, the light guide film 2, the light diffusion sheet 5, and the prism sheet 6 are illustrated separately in FIG. 1, in reality, the front face of the reflection sheet 7 abuts the back face of the light guide film 2, the front face of the light guide film 2 abuts the back face of the light diffusion sheet 5, and the front face of the light diffusion sheet 5 abuts the back face of the prism sheet 6.

Light Diffusion Sheet

Figure 2:
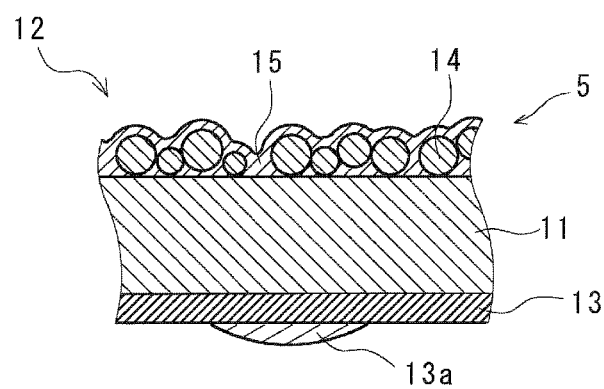
FIG. 2 is a schematic partial enlarged view illustrating a light diffusion sheet of the backlight unit of FIG. 1.

As shown in FIG. 2, the light diffusion sheet 5 comprises a substrate layer 11, a light diffusion layer 12 overlaid on the front face side of the substrate layer 11, and a back layer 13 overlaid on the back face side of the substrate layer 11. Furthermore, the light diffusion sheet 5 comprises a plurality of protruding portions 13a as sticking preventive parts provided scatteredly on the back face (the back face of the back layer 13). The plurality of protruding portions 13a is integrally molded with the back layer 13 (In other words, the plurality of protruding portions 13a are formed integrally with the back layer 13.). The light diffusion sheet 5 is formed in a rectangular shape in a planar view. The light diffusion sheet 5 consists of the substrate layer 11, the light diffusion layer 12, the back layer 13, and the plurality of protruding portions 13a (In other words, the light diffusion sheet 5 does not include any other layer than the substrate layer 11, the light diffusion layer 12, the back layer 13, and the plurality of protruding portions 13a.).

Substrate Layer

Since the substrate layer 11 needs to transmit rays of light, the substrate layer 11 is formed to be transparent. The substrate layer 11 comprises a synthetic resin as a principal component. The principal component of the substrate layer 11 is not particularly limited, and exemplified by polyethylene terephthalate, polyethylene naphthalate, an acrylic resin, an acrylic urethane resin, polycarbonate, polystyrene, polyolefin, cellulose acetate, weather resistance vinyl chloride, and the like. Of these, polyethylene terephthalate having superior transparency and a superior strength is preferred, and polyethylene terephthalate having an ameliorated deflection performance is particularly preferred. It is to be noted that the term "principal component" as referred to herein means a component which is of the highest content, for example, a component the content of which is no less than 50% by mass.

The lower limit of the average thickness of the substrate layer 11 is preferably 10 μm, more preferably 23 μm, and still more preferably 38 μm. Meanwhile, the upper limit of the average thickness of the substrate layer 11 is preferably 500 μm, more preferably 250 μm, and still more preferably 188 μm. When the average thickness of the substrate layer 11 is less than the lower limit, a curl may occur in a case where the light diffusion layer 12 is formed by coating. In addition, when the average thickness of the substrate layer 11 is less than the lower limit, a deflection may be likely to occur. To the contrary, when the average thickness of the substrate layer 11 is greater than the upper limit, the luminance of the backlight unit 1 may be reduced, and the requirement of a reduction in thickness of the backlight unit 1 may not be satisfied. It is to be noted that the term "average thickness" as referred to herein means an averaged value of the thickness of arbitrary ten points.

Light Diffusion Layer

The light diffusion layer 12 corresponds to the frontmost face of the light diffusion sheet 5. The light diffusion layer 12 comprises a plurality of beads 14 and a binder 15 for the beads. The beads 14 are surrounded by the binder 15. The light diffusion layer 12 allows the rays of light transmitting from the back face side to the front face side to diffuse substantially uniformly by the plurality of beads 14 being contained in a dispersion state. Furthermore, in the light diffusion layer 12, micro uneven shapes are formed substantially uniformly by the plurality of beads 14 on the front face, and each recessed part and each protruding portion of the micro uneven shapes is formed in a lens shape. By a lens-like effect due to such micro uneven shapes, the light diffusion layer 12 exhibits a superior light diffusion function, and has a refraction function that refracts the transmitted rays of light in a normal direction as well as a light condensing function that condenses the transmitted rays of light macroscopically in a normal direction due to this light diffusion function.

The beads 14 are resin particles having properties that diffuse rays of light. The principal component of the beads 14 is exemplified by an acrylic resin, an acrylonitrile resin, a polyurethane, a polyvinyl chloride, a polystyrene, a polyamide, a polyacrylonitrile, and the like. Of these, an acrylic resin having a superior transparency is preferred, and polymethyl methacrylate (PMMA) is particularly preferred.

The shape of the beads 14 is not particularly limited, and may be spherical, cuboidal, needle-shaped, rod-shaped, spindle-shaped, plate-like, scale-like, fibrous, and the like. Of these, a spherical shape having a superior light diffusibility is preferred.

The lower limit of the average particle size of the beads 14 is preferably 1 μm, more preferably 2 μm, and still more preferably 5 μm. Meanwhile, the upper limit of the average particle size of the beads 14 is preferably 15 μm, more preferably 10 μm, and still more preferably 8 μm. When the average particle size of the beads 14 is less than the lower limit, the uneven shapes on the front face of the light diffusion layer 12 are small, and thus, the light diffusibility required as the light diffusion sheet 5 may be insufficient. To the contrary, when the average particle size of the beads 14 is greater than the upper limit, the thickness of the light diffusion sheet 5 increases, and thus, a uniform diffusion of rays of light may be difficult. It is to be noted that the term "average particle size of beads" as referred to means an average particle size of a plurality of beads calculated from the volume-base particle size distribution measured by a laser diffraction method.

The lower limit of the blended amount of the beads 14 (the blended amount, in terms of solid content equivalent, with respect to 100 parts by mass of a polymer in a polymer composition as a material for forming the binder 15) is preferably 10 parts by mass, more preferably 20 parts by mass, and still more preferably 50 parts by mass. Meanwhile, the upper limit of the blended amount of the beads 14 is preferably 500 parts by mass, more preferably 300 parts by mass, and still more preferably 200 parts by mass. When the blended amount of the beads 14 is less than the lower limit, the light diffusibility may be insufficient. To the contrary, when the blended amount of the beads 14 is greater than the upper limit, the beads 14 may not be fixed by the binder 15 securely.

The binder 15 is formed by hardening (crosslinking, etc.) a polymer composition containing a base polymer. The beads 14 are provided to be fixed by the binder 15 on the entire front face of the substrate layer 11 in substantially equal density. It is to be noted that a polymer composition for forming the binder 15 may be appropriately blended with a fine inorganic filler, a hardening agent, a plasticizer, a dispersant, various types of levelling agents, an antistatic agent, a UV absorbent, an ultraviolet ray-absorbing agent, an anti-oxidizing agent, a viscosity modifier, a lubricant, a light stabilizer, and the like.

Back Layer

Since the back layer 13 needs to transmit rays of light, the back layer 13 is formed to be transparent. The back layer 13 comprises a synthetic resin as a principal component. The principal component of the back layer 13 is not particularly limited, and exemplified by a thermosetting resin, an active energy ray-curable resin, and the like.

Examples of the thermosetting resin include an epoxy resin, a silicone resin, a phenol resin, a urea resin, an unsaturated poly ester resin, a melamine resin, an alkyd resin, an acrylic resin, an amide functional copolymer, and a urethane resin.

Examples of the active energy ray-curable resin include an ultraviolet ray-curable resin that is crosslinked and cured upon irradiation with ultraviolet rays and an electron beam curable resin that is crosslinked and cured upon irradiation with an electron beam, and can be appropriately selected from polymerizable monomers and polymerizable oligomers. Of these, as the active energy ray-curable resin, acrylic, urethane, or acrylic urethane ultraviolet ray-curable resins are preferred.

The plurality of protruding portions 13a are integrally molded with the back layer 13 by using the same principal component as the back layer 13 (In other words, the plurality of protruding portions 13a are formed integrally with the back layer 13.).

Figure 3:
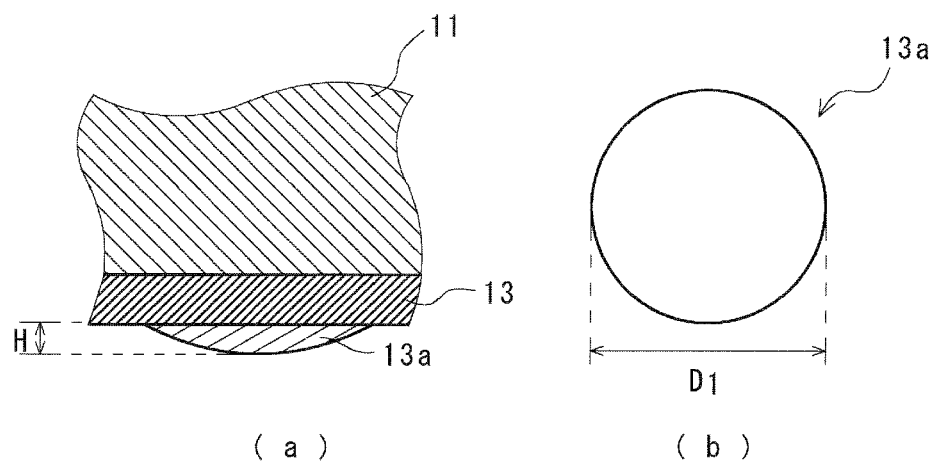
FIG. 3a is a schematic enlarged lateral view illustrating protruding portions of the light diffusion sheet of FIG. 2.
FIG. 3b is a schematic enlarged rear view illustrating protruding portions of the light diffusion sheet of FIG. 2.

Each protruding portion 13a has a flattened semi-spherical shape or a flattened conical shape with a rounded apex, and, particularly in the present embodiment, as shown in FIGS. 3a and 3b, a flattened half spheroidal shape. When each protruding portion 13a has a flattened half spheroidal shape, the reliable prevention of scuffs from being produced on the front face of other optical members disposed on the back face side is enabled. The plurality of protruding portions 13a are provided so as to protrude randomly (without regularity) on the back face of the back layer 13. According to the light diffusion sheet 5, since the plurality of protruding portions 13a are provided so as to protrude randomly, the prevention of moire from occurring based on the plurality of protruding portions 13a is enabled. It is to be noted that the term "half spheroidal shape" is not limited to a half spheroidal shape in a strict sense of the word, and thus, may include a shape having a perfect circle-like base and a dorm-shaped external face formed by a curved face.

The lower limit of the average curvature radius of the apex of the protruding portion 13a is preferably 20 μm, and more preferably 50 μm. Meanwhile, the upper limit of the average curvature radius of the apex of the protruding portion 13a is preferably 200 μm, and more preferably 100 μm. When the average curvature radius is less than the lower limit, scuffs may be produced on the front face of the light guide film 2 disposed on the back face side of the light diffusion sheet 5. To the contrary, when the average curvature radius is greater than the upper limit, the area of the protruding portions 13a abutting the front face of the light guide film 2 becomes larger, and thus, lack in uniformity of the luminance may be caused due to the rays of light entering the abutting parts. It is to be noted that the term "average curvature radius of an apex of a protruding part" as referred to means an averaged value of curvature radii of the farthest portions from the average interface of the back face of the back layer of arbitrarily extracted ten protruding portions.

The lower limit of the average diameter $D_1$ of the protruding portions 13a is preferably 5 μm, more preferably 7 μm, and still more preferably 10 μm. Meanwhile, the upper limit of the average diameter $D_1$ of the protruding portions 13a is preferably 60 μm, more preferably 50 μm, still more preferably 40 μm, and particularly preferably 20 μm. When the average diameter $D_1$ of the protruding portions 13a is less than the lower limit, the curvature radius of the apex of the protruding portions 13a is too small to secure the height H of the protruding portion 13a sufficiently, and scuffs may be produced on the front face of the light guide film 2 disposed on the back face side of the light diffusion sheet 5. To the contrary, when the average diameter $D_1$ of the protruding portions 13a is greater than the upper limit, the protruding portion 13a is too high to maintain the curvature radius of the apex of the protruding portions 13a in a preferred range, and the requirement of a reduction in thickness of the backlight unit may not be satisfied.

The lower limit of the average height H of the protruding portion 13a is preferably 0.5 μm, more preferably 0.8 μm, and still more preferably 1.0 μm. Meanwhile, the upper limit of the average height H of the protruding portion 13a is preferably 6 μm, more preferably 5 μm, and still more preferably 4 μm. When the average height H of the protruding portions 13a is less than the lower limit, the other parts than the protruding portion 13a are likely to abut the light diffusion sheet 5 and the light guide film 2, lack in uniformity of the luminance may be caused due to the rays of light entering this abutting part. To the contrary, when the average height H of the protruding portions 13a is greater than the upper limit, the requirement of a reduction in thickness of the backlight unit may not be satisfied, and scuffs may be also produced on the front faces of the other optical members (the light guide film 2) disposed on the back face side.

The plurality of protruding portions 13a preferably have a uniform height H. The upper limit of the coefficient of variation of the height H of the plurality of protruding portions 13a is preferably 0.2, more preferably 0.1, and still more preferably 0.05. When the coefficient of variation of the height H of the plurality of protruding portions 13a is greater than the upper limit, the height H of the plurality of protruding portions 13a is not uniform, and thus, the load is biased onto higher protruding portions 13a. Based on this phenomenon, scuffs may be produced on the front face of the light guide film 2. Meanwhile, the lower limit of the coefficient of variation of the height H of the plurality of protruding portions 13a is not particularly limited, and, for example, may be set to be zero. It is to be noted that the term "coefficient of variation" of the height of the plurality of protruding portions as referred to means a value calculated by dividing, by an average height, a standard deviation of the heights of arbitrarily extracted 20 protruding portions.

The lower limit of the ratio ($H/D_1$) of the average height H to the average diameter $D_1$ of the plurality of protruding portions 13a is preferably 0.02, more preferably 0.05, and still more preferably 0.10. Meanwhile, the upper limit of the ratio ($H/D_1$) is preferably 0.2, more preferably 0.15, and still more preferably 0.12. When the ratio ($H/D_1$) is less than the lower limit, the area of the plurality of protruding portions 13a abutting the front face of the light guide film 2 becomes larger, and thus, lack in uniformity of the luminance may be caused due to the rays of light entering the abutting parts. To the contrary, when the ratio ($H/D_1$) is greater than the upper limit, the apexes of the plurality of protruding portions 13a are too sharp, and scuffs may be produced on the front face of the light guide film 2.

The lower limit of the average pitch of the protruding portions 13a is preferably 200 μm, more preferably 300 μm, and still more preferably 400 μm. Meanwhile, the upper limit of the average pitch of the protruding portions 13a is preferably 1,000 μm, more preferably 900 μm, and still more preferably 800 μm. When the average pitch of the protruding portions 13a is less than the lower limit, number of the protruding portions 13a is excessive, and scuffs may be produced on the front face of the light guide film 2. Furthermore, when the average pitch of the protruding portions 13a is less than the lower limit, number of the protruding portions 13a is excessive, and, when a diffraction grating shape is formed on a forming face of the protruding portion 13a as in an embodiment described later, the diffraction grating performance may be deteriorated. To the contrary, when the average pitch of the protruding portions 13a is greater than upper limit, number of the protruding portions 13a may be insufficient, and sticking may not be prevented sufficiently. It is to be noted that the term "average pitch" of the protruding portions as referred to means an averaged value of the pitches of each of arbitrarily extracted ten protruding portions as well as the pitches of the other protruding portions which are the most adjacent to these protruding portions.

The lower limit of the occupancy area ratio the plurality of protruding portions 13a is preferably 2%, more preferably 3%, and still more preferably 4%. Meanwhile, the upper limit of the occupancy area ratio of the plurality of protruding portions 13a is preferably 80%, more preferably 70%, and still more preferably 60%, and particularly preferably 40%. When the occupancy area ratio of the plurality of protruding portions 13a is less than the lower limit, sticking may not be prevented sufficiently. To the contrary, when the occupancy area ratio of the plurality of protruding portions 13a is greater than the upper limit, scuffs may be produced on the front face of the light guide film 2.

The lower limit of the ratio of the average diameter $D_1$ of the protruding portions 13a to the average particle size of the beads 14 is preferably 3, more preferably 4, and still more preferably 5. Meanwhile, the upper limit of the ratio is preferably 9, more preferably 8, and still more preferably 7. When the ratio is less than the lower limit, the amount of rays of light that are allowed to enter the protruding portions 13a may be insufficient and the rays of light may not be received sufficiently by the protruding portions 13a, and furthermore, the amount of rays of light that are subjected to mirror reflection on the back face of the back layer 13 of the light diffusion sheet 5 may increase. To the contrary, when the ratio is greater than the upper limit, the curved shape of the protruding portion 13a is too smooth, and the rays of light may not be received sufficiently by the protruding portions 13a.

The plurality of protruding portions 13a are formed from a synthetic resin as a principal component. Furthermore, the plurality of protruding portions 13 do not contain beads inside. According to the light diffusion sheet 5, since the plurality of protruding portions 13 do not contain beads inside, the prevention of scuffs from being produced on the front face of the light guide film 2 disposed on the back face side of the light diffusion sheet 5 due to the detachment of the beads is enabled.

Prism Sheet

Figure 4:
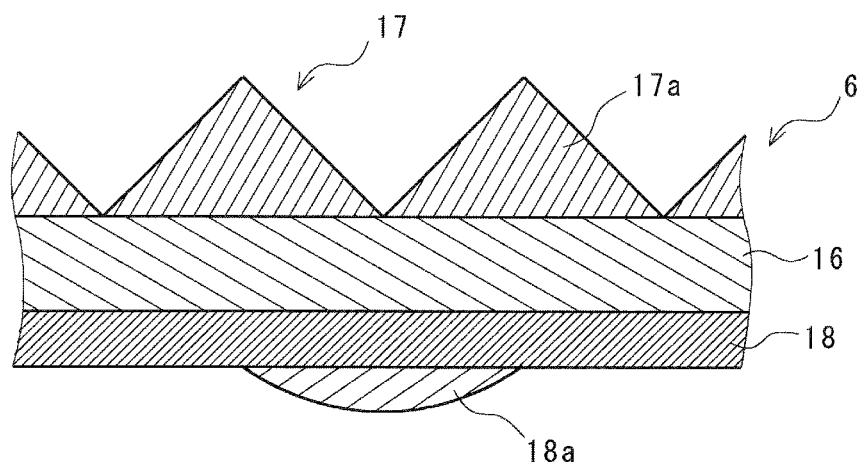
FIG. 4 is a schematic partial enlarged view illustrating a prism sheet of the backlight unit of FIG. 1.

As shown in FIG. 4, the prism sheet 6 comprises a substrate layer 16, a prism array 17 overlaid on the front face side of the substrate layer 16, and a back layer 18 overlaid on the back face side of the substrate layer 16. The prism array 17 is structured by providing a plurality of protruding and streaking prism portions 17a in parallel. Furthermore, the prism sheet 6 comprises a plurality of protruding portions 18a as sticking preventive parts provided scatteredly on the back face of the back layer 18. The prism sheet 6 consists of the substrate layer 16, the prism array 17, the back layer 18, and the plurality of protruding portions 18a (in other words, the prism sheet 6 does not include any other layer than the substrate layer 16, the prism array 17, the back layer 18 and the plurality of protruding portions 18a.). The prism sheet 6 is formed in a rectangular shape in a planar view.

Since the substrate layer 16 and the prism array 17 need to transmit rays of light, the substrate layer 16 and the prism array 17 are formed to be transparent. The substrate layer 16 and the prism array 17 comprise a synthetic resin as a principal component. The principal component of the substrate layer 16 and the prism array 17 is exemplified by a synthetic resin similarly to the principal component of the substrate layer 11 of the light diffusion sheet 5. Furthermore, as the principal component of the substrate layer 16 and the prism array 17, a thermosetting resin, an active energy ray-curable resin, and the like, similarly to those for the plurality of protruding portions 13a of the light diffusion sheet 5 can be used. It is to be noted that, in the present embodiment, the direction of the prism array 17 (the ridge line direction of the plurality of protruding and streaking prism portions 17a) is perpendicular to a direction in which the light source 3 emits the rays of light.

The lower limit of the height from the back face of the substrate layer 16 of the prism sheet 6 to the vertex of the protruding and streaking prism portions 17a is preferably 50 µm, and more preferably 100 µm. Meanwhile, the upper limit of the height is preferably 200 µm, and more preferably 180 µm. The lower limit of the average pitch of the plurality of protruding and streaking prism portions 17a of the prism sheet 6 is preferably 10 µm, and more preferably 20 µm. Meanwhile, the upper limit of the average pitch of the plurality of protruding and streaking prism portions 17a is preferably 100 µm, and more preferably 60 µm. The vertex angle of the protruding and streaking prism portion 17a is preferably no less than 85° and no greater than 95°. Furthermore, the base angle of the protruding and streaking prism portion 17a is preferably no less than 42° and no greater than 48°. The lower limit of the refractive index of the prism sheet 6 is preferably 1.5, and more preferably 1.55. Meanwhile, the upper limit of the refractive index of the prism sheet 6 is preferably 1.7. It is to be noted that the term "average pitch of the protruding and streaking prism portions" as referred to means an average pitch of arbitrarily extracted contiguous ten protruding and streaking prism portions. Furthermore, the term "refractive index" as referred to means a refractive index of the light having a wavelength of 589.3 nm (Sodium D-line), and an averaged value of three tests measured at a temperature of 23° C., using a plate like test piece having a side of 70 mm and a thickness of 2 mm. Furthermore, the term "refractive index of a prism sheet" as referred to means a refractive index of the protruding and streaking prism portions.

Since the back layer 18 needs to transmit rays of light, the back layer 18 is formed to be transparent. The back layer 18 comprises a synthetic resin as a principal component. As the principal component of the back layer 18, a similar principal component to that of the back layer 13 of the light diffusion sheet 5 can be used.

The plurality of protruding portions 18a are integrally molded with the back layer 18 by using the same principal component as the back layer 18 (In other words, the plurality of protruding portions 18a are formed integrally with the back layer 18.).

The plurality of protruding portions 18a correspond to the backmost face of the prism sheet 6. Each protruding portion 18a has a flattened semi-spherical shape or a flattened conical shape with a rounded apex, and, particularly in the present embodiment, a flattened half spheroidal shape. The plurality of protruding portions 18a are provided so as to protrude randomly (without regularity) on the back face of the back layer 18. The specific shape of the plurality of protruding portions 18a is similar to that of the plurality of protruding portions 13a of the light diffusion sheet 5.

The lower limit of the ratio of the average diameter of the protruding portion 18a to the average pitch of the protruding and streaking prism portions 17a is preferably 0.1, more preferably 0.3, and still more preferably 0.5. Meanwhile, the upper limit of the ratio is preferably 6.0, more preferably 3.0, and still more preferably 1.0. When the ratio is less than the lower limit, the amount of rays of light that are allowed to enter the protruding portions 18a may be insufficient and the rays of light may not be received sufficiently by the protruding portions 18a, and furthermore, the amount of rays of light that are subjected to mirror reflection on the back face of the back layer 18 of the prism sheet 6 may increase. To the contrary, when the ratio is greater than the upper limit, the curved shape of the protruding portion 18a is too smooth, and the rays of light may not be received sufficiently by the protruding portions 18a.

Light Guide Film

The light guide film 2 allows the rays of light entering from the end face to exit from the front face substantially uniformly. The light guide film 2 is formed in a substantially rectangular shape in a planar view, and is formed in a plate-like shape (non-wedge shape) having a substantially uniform thickness. The light guide film 2 comprises a plurality of recessed parts 9 that are caved on the back face toward the front face side. Furthermore, the light guide film 2 comprises sticking preventive parts on the back face. Specifically, the light guide film 2 comprises a plurality of raised parts 8, as the sticking preventive parts, which are present around the plurality of recessed parts 9 and protrude toward the back face side. The raised parts 8 are provided to be adjacent to the recessed parts 9, and the inner faces of the raised parts 8 are formed to be continuous with the forming faces of the recessed parts 9.

The lower limit of the average thickness of the light guide film 2 is preferably 100 μm, more preferably 150 μm, and still more preferably 200 μm. Meanwhile, the upper limit of the average thickness of the light guide film 2 is preferably 600 μm, more preferably 580 μm, and still more preferably 550 μm. When the average thickness of the light guide film 2 is less than the lower limit, the strength of the light guide film 2 may be insufficient, and the rays of light exiting from the light source 3 may not be allowed to enter the light guide film 2 sufficiently. To the contrary, when the average thickness of the light guide film 2 is greater than the upper limit, the requirement of a reduction in thickness of the backlight unit 1 may not be satisfied.

The plurality of recessed parts 9 function as light scattering parts that scatter incident light on the front face side. Each recessed part 9 is formed in a substantially circular shape in a planar view. Furthermore, each recessed part 9 is formed so that the diameter thereof gradually decreases toward the front face side. The shape of the recessed part 9 is not particularly limited, and, for example, may be semi-spherical, half ellipsoidal, conical, conic trapezoidal, or the like. Of these, the shape of the recessed part 9 is preferably semi-spherical or half ellipsoidal. When the shape of the recessed part 9 is semi-spherical or half ellipsoidal, moldability of the recessed part 9 can be improved, and the rays of light entering the recessed part 9 can be scattered suitably.

The raised part 8 is formed to be continuous with the face perpendicular to the thickness direction of the light guide film 2 on the back face of the light guide film 2. Specifically, the raised part 8 is formed to be continuous with a flat face of the back face of the light guide film 2. The raised part 8 is formed in a substantially annular shape in a planar view so as to surround the recessed part 9. According to the light guide film 2, when the raised part 8 is formed in a substantially annular shape in a planar view so as to surround the recessed part 9, the easy and reliable prevention of sticking of the recessed part 9 as well as the vicinity of the recessed part 9 with the reflection sheet 7 disposed on the back face side of the light guide film 2 is enabled.

The light guide film 2 has flexibility. Since the light guide film 2 has flexibility, the inhibition of scuffs on the reflection sheet 7 disposed on the back face side is enabled. Since the light guide film 2 needs to transmit rays of light, the light guide film 2 is formed to be transparent. The light guide film 2 comprises a synthetic resin as a principal component.

The principal component of the light guide film 2 is exemplified by polycarbonate, an acrylic resin, polyethylene terephthalate, polyethylene naphthalate, polystyrene, methyl (meth)acrylate-styrene copolymer, polyolefin, cycloolefin polymer, cycloolefin copolymer, cellulose acetate, weather resistant vinyl chloride, an active energy ray-curable resin, and the like. Of these, the principal component of the light guide film 2 is preferably polycarbonate or an acrylic resin. Since polycarbonate has superior transparency and a high refractive index, when the light guide film 2 comprises polycarbonate as a principal component, a total reflection is likely to occur on the back face of the light guide film 2, and the efficient delivery of the rays of light is enabled. Furthermore, since polycarbonate has a heat resistance, deterioration thereof due to heat generation of the light source 3 is less likely to occur. Moreover, since polycarbonate has lower water absorbing properties as compared with acrylic resins, the dimension accuracy is high. Therefore, since the light guide film 2 comprises polycarbonate as a principal component, the inhibition of aging deterioration thereof is enabled. Meanwhile, since the acrylic resins have a high transparency, the reduction of a loss of rays of light at the light guide film 2 is enabled.

LED Light Source

A plurality of LEDs 3 are provided along a single end face of the light guide film 2. The plurality of LED light sources 3 are provided so that each of the faces of the LEDs 3 that emit rays of light faces (or abuts) the single end face of light guide film 2.

Reflection Sheet

The reflection sheet 7 is disposed on the back face side of the light guide film 2 so as to abut the plurality of raised parts 8 which are formed on the back face of the light guide film 2. The reflection sheet 7 allows the rays of light exiting from the back face of the light guide film 2 to be reflected upwards. The reflection sheet 7 is exemplified by: a white sheet in which a filler is contained in a dispersion state in a base resin such as polyester; a mirror sheet obtained by vapor deposition of a metal such as aluminum and silver on the front face of a film made of a polyester or the like to enhance regular reflection properties; and the like.

Advantages

Since the optical sheet (the light diffusion sheet 5 and the prism sheet 6) comprises the plurality of protruding portions 13a and 18a provided scatteredly on the back face, the optical sheet partially abuts other optical members disposed on the back face side of the optical sheets by means of the plurality of protruding portions 13a and 18a. Therefore, according to the optical sheet, the prevention of sticking with the other optical members disposed on the back face side is enabled. Furthermore, according to the optical sheet, since the protruding portions 13a and 18a each have a flattened semi-spherical shape or a flattened conical shape with rounded apexes, the curved faces of the apexes (lower ends) of the plurality of protruding portions 13a and 18a are comparatively smooth, whereby the prevention of scuffs from being produced on the front face of the other optical members disposed on the back face side is enabled.

Since the backlight unit 1 comprises the optical sheet (the light diffusion sheet 5 and the prism sheet 6), as described above, the prevention of sticking of the optical sheet with the other optical members disposed on the back face side of the optical sheets is enabled, and the prevention of scuffs from being produced on the front faces of the other optical members is also enabled.

Production Method of Optical Sheet

Next, a production method of the optical sheet will be explained. Here, a production method will be explained in a case where the optical sheet is the aforementioned light diffusion sheet 5. The production method of the optical sheet comprises conveying a resin film; supplying an ultraviolet ray-curable resin composition; and irradiating with an ultraviolet ray. The production method of the optical sheet further comprises overlaying a light diffusion layer.

Production Apparatus

Figure 5:
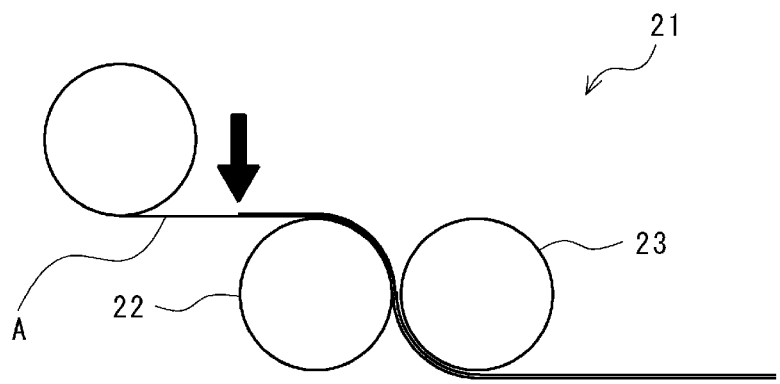
FIG. 5 is a schematic view illustrating a production apparatus of the light diffusion sheet of FIG. 2.

The production method of the optical sheet is performed by using a production apparatus 21 of FIG. 5, for example. The production apparatus 21 comprises a pair of pressure rollers 22 and 23 which is provided to be adjacent to and in parallel with each other. The pair of pressure rollers 22 and 23 is provided with a temperature control means, and configured to be able to control the surface (circumferential surface) temperature at an optimum temperature. As the pair of pressure rollers 22 and 23, a metal elastic roller comprising a metal roller and a flexible roller covered with an elastic body on the surface is preferably used. Furthermore, the pressure roller 23 comprises a plurality of recessed parts on the surface (circumferential surface). Specifically, the pressure roller 23 comprises, on the front face, a reversed shape of the back face shape that comprises the plurality of protruding portions 13a provided scatteredly.

Step of Conveying Resin Film

In the step of conveying the resin film, a strip-shaped resin film A is delivered onto the surfaces of the pair of pressure rollers 22 and 23. Specifically, in the step of conveying the resin film, the resin film A that forms the substrate layer 11 of the light diffusion sheet 5 is delivered between the pair of pressure rollers 22 and 23.

Step of Supplying Ultraviolet Ray-Curable Resin Composition

In the step of supplying the ultraviolet ray-curable resin composition, an ultraviolet ray-curable resin composition is supplied between the resin film A and the pressure roller 23. In the step of supplying the ultraviolet ray-curable resin composition, the resin film A and the ultraviolet ray-curable resin composition supplied on one lateral face of the resin film A are pressed by the pair of pressure rollers 22 and 23. In the step of supplying the ultraviolet ray-curable resin composition, the plurality of protruding portions 13a are transferred onto an external face (one lateral face) of the ultraviolet ray-curable resin composition overlaid on the one lateral face of the resin film A.

Step of Irradiating with Ultraviolet Ray

In the step of irradiating with an ultraviolet ray, the ultraviolet ray-curable resin composition onto which the plurality of protruding portions 13a have been transferred in the step of supplying the ultraviolet ray-curable resin composition is irradiated with an ultraviolet ray, thereby curing this ultraviolet ray-curable resin composition. By the step of irradiating with the ultraviolet ray, the plurality of protruding portions 13a are formed on the one lateral side of the resin film A.

Step of Overlaying Light Diffusion Layer

In the step of overlaying the light diffusion layer, after the step of irradiating with an ultraviolet ray, a coating liquid comprising the plurality of beads 14 and a binder composition is applied to the other lateral face of the resin film A, and the applied coating liquid is further dried and cured. By this light diffusion layer laminating step, the light diffusion layer 12 is overlaid on the resin film A.

It is to be noted that, although the procedure of laminating the light diffusion layer 12 after forming the plurality of protruding portions 13a has been explained, the production method of the light diffusion sheet is not limited to the procedure, and the plurality of protruding portions 13a may be formed after overlaying the light diffusion layer 12.

In addition, although the production method in a case where the optical sheet is the light diffusion sheet 5 was explained herein, the optical sheet in a case where the optical sheet is the prism sheet 6 can also be produced by employing the resin film conveying step, the ultraviolet ray-curable resin composition supplying step, and the ultraviolet ray irradiating step as described above. Specifically, the production method of the prism sheet 6 is exemplified by (a) the procedure of applying an active energy ray-curable resin to the other lateral face of the resin film after the ultraviolet ray irradiating step, pressing the resultant film to a sheet die, a metal die, or a roll die having a reversed shape of the prism array 17 to transfer the shape onto the uncured active energy ray-curable resin, and irradiating an active energy ray to cure the active energy ray-curable resin, (b) the procedure of forming a reversed shape of the prism array 17 on the circumferential face of the other pressure roller 23 and providing a resin in a molten state on the other lateral face of the resin film to transfer the shape, and the like. In addition, as the production method of the prism sheet, the plurality of protruding portions may be formed after forming the prism array 17.

Advantages

According to the production method of the optical sheet, by the roller 23 having, on the surface, the reversed shape of the plurality of protruding portions 13a and 18a each having a flattened semi-spherical shape or a flattened conical shape with rounded tip apexes, the formation of the plurality of protruding portions 13a and 18a on the one lateral face of the resin film is enabled. Therefore, according to the production method of an optical sheet for a liquid crystal display device of the embodiment of the present application, the production of the optical sheet (the light diffusion sheet 5 and the prism sheet 6) in which the prevention of sticking thereof is enabled by partially abutting the other optical members by means of the plurality of protruding portions 13a and 18a and the prevention of scuffs from being produced on the other optical members that abut the plurality of protruding portions 13a and 18a is also enabled, is enabled.

SECOND EMBODIMENT

Backlight Unit

Figure 6:
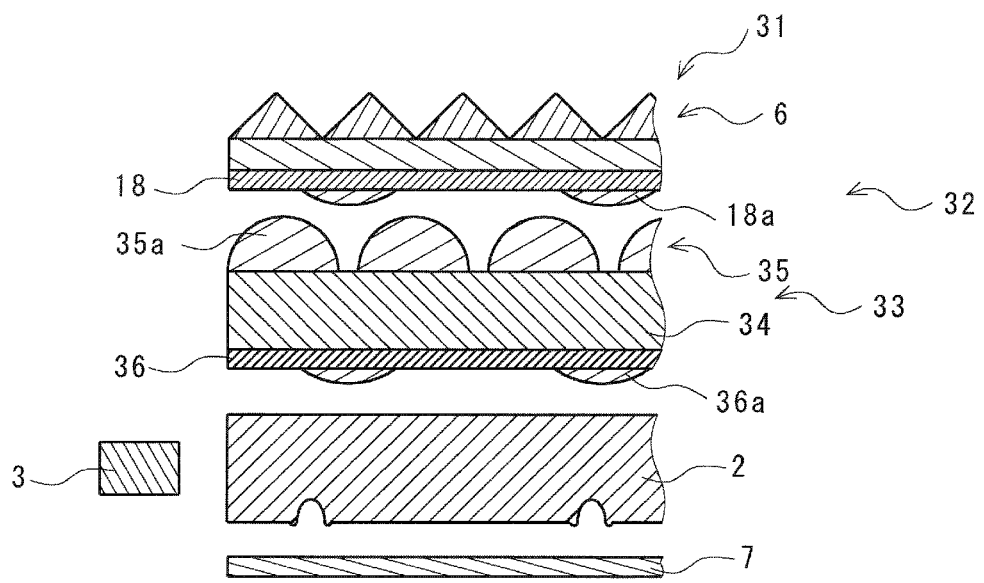
FIG. 6 is a schematic end view illustrating a backlight unit according to a different embodiment from that of the backlight unit of FIG. 1.

A backlight unit 31 for a liquid crystal display device of FIG. 6 is an edge-lit backlight unit, and is provided with a plurality of LED light sources. The backlight unit 31 comprises a light guide film 2 as an optical waveguide sheet that guides rays of light entering from an end face toward the front face side, a plurality of LED light sources 3 disposed along the end face of the light guide film 2, and a plurality of optical sheets 32 that are superposed on the front face side of the light guide film 2. The backlight unit 31 comprises a micro lens sheet 33, as the plurality of optical sheets 32, overlaid directly (without through another sheet, etc.) on the front face of the light guide film 2, and a prism sheet 6 overlaid directly (without through another sheet, etc.) on the front face of the micro lens sheet 33. The backlight unit 31 further comprises a reflection sheet 7 disposed on the back face side of the light guide film 2. It is to be noted that although the reflection sheet 7, the light guide film 2, the micro lens sheet 33, and the prism sheet 6 are illustrated separately in FIG. 6, practically, the front face of the reflection sheet 7 abuts the back face of the light guide film 2, the front face of the light guide film 2 abuts the back face of the micro lens sheet 33, and the front face of the micro lens sheet 33 abuts the back face of the prism sheet 6. Since the light guide film 2, the LED light source 3, the prism sheet 6, and the reflection sheet 7 are similar to those of the backlight unit 1 of FIG. 1, explanation thereof will be omitted through designating the identical number.

Micro Lens Sheet

Figure 7:
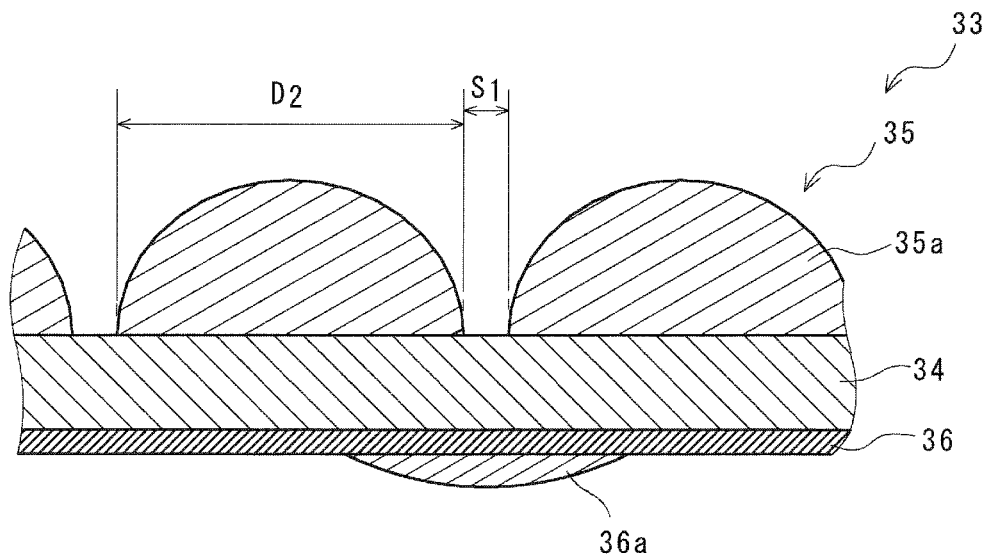
FIG. 7 is a schematic partial enlarged view illustrating a micro lens sheet of the backlight unit of FIG. 6.

As shown in FIG. 7, the micro lens sheet 33 comprises a substrate layer 34, a micro lens array 35 overlaid on the front face side of the substrate layer 34, and a back layer 36 overlaid on the back face side of the substrate layer 34. The micro lens array 35 is structured with a plurality of micro lenses 35a that are provided so as to protrude on the front face of the substrate layer 34. Furthermore, the micro lens sheet 33 comprises a plurality of protruding portions 36a as sticking preventive parts provided scatteredly on the back face of the back layer 36. The micro lens sheet 33 consists of the substrate layer 34, the micro lens array 35, the back layer 36, and the plurality of protruding portions 36a (In other words, the micro lens sheet 33 does not include any other layer than the substrate layer 34, the micro lens array 35, the back layer 36, and the plurality of protruding portions 36a.).

Since the substrate layer 34 and the micro lens array 35 need to transmit rays of light, the substrate layer 34 and the micro lens array 35 are formed to be transparent. The substrate layer 34 and the micro lens array 35 comprise a synthetic resin as a principal component. The principal component of the substrate layer 34 and the micro lens array 35 is exemplified by a synthetic resin similar to the principal component of the substrate layer 11 of the light diffusion sheet 5. Furthermore, as the principal component of the substrate layer 34 and the micro lens array 35, a thermosetting resin, an active energy ray-curable resin, and the like, similarly to those for the back layer 13 of the light diffusion sheet 5 can be used.

The average thickness of the substrate layer 34 may be adjusted to be the same as the average thickness of the substrate layer 11 of the light diffusion sheet 5, for example. The micro lens array 35 may be molded integrally with the substrate layer 34 (in other words, may be formed integrally with the substrate layer 34) or may be formed separately from the substrate layer 34.

The micro lens 35a is formed to have a semi-spherical shape (including a shape similar to a semi-sphere). It is to be noted that, as shown in FIG. 7, the micro lens 35 may be formed in a convex lens shape or in a concave lens shape. The plurality of micro lenses 35a are provided on the front face of the substrate layer 34 comparatively densely as well as geometrically. Specifically, the plurality of micro lenses 35a are provided on the front face of the substrate layer 34 in a regular triangle grating pattern. Therefore, all of the pitches of the plurality of micro lenses 35a and the distance $S_1$ between the lenses are constant. With this provided pattern, the plurality of micro lenses 35a can be provided in the densest way. It is to be noted that the provided pattern of the plurality of micro lenses 35a is not limited to the densely fillable triangle grating pattern, and may be, for example, a regular tetragon grating pattern and a random pattern. With the random pattern, the occurrence of moire may be reduced when overlaid with other optical members.

The lower limit of the average diameter $D_2$ of the micro lens 35a is preferably 10 μm, more preferably 100 μm, and still more preferably 200 μm. Meanwhile, the upper limit of the average diameter $D_2$ of the micro lens array 35a is preferably 1,000 μm, more preferably 700 μm, and still more preferably 500 μm. When the average diameter $D_2$ of the micro lenses 35a is less than the lower limit, a diffraction influence is significant, and the degradation of an optical performance and color separation are likely to occur. To the contrary, when the average diameter $D_2$ of the micro lenses 35a is greater than the upper limit, the thickness may increase, and lack in uniformity of the luminance may be likely to be caused. It is to be noted that the term "average diameter of micro lenses" as referred to means an averaged value of the average diameters of the bases of arbitrarily extracted ten micro lenses. In addition, the average diameter of each of the micro lenses as referred to means an intermediate value between the maximum diameter and the minimum diameter of the bases.

The lower limit of the height ratio of the height to the curvature radius of the micro lens 35a is preferably 0.6, and more preferably 0.75. Meanwhile, the upper limit of the height ratio is preferably 1. When the height ratio falls within the aforementioned range, a lens-like refracting action of the micro lens 35a is exhibited effectively, and optical functions such as light condensing of the micro lens sheet 33 is significantly improved.

The upper limit of the interval ratio ($S_1/D_2$) of the average distance $S_1$ between lenses to the average diameter $D_2$ of the micro lens 35a is preferably 0.5, and more preferably 0.2. When the interval ratio ($S_1/D_2$) is no greater than the upper limit, flat parts that do not contribute to optical functions is reduced, and the optical functions such as light condensing of the micro lens sheet 33 is significantly improved.

The lower limit of the filling rate of the plurality of micro lenses 35a is preferably 40%, and more preferably 60%. When the filling rate of the plurality of micro lenses 35a is no less than the lower limit, the occupancy area of the plurality of micro lenses 35a becomes larger, and optical functions such as light condensing of the micro lens sheet 33 is significantly improved. It is to be noted that the term "filling rate" of the plurality of micro lenses as referred to means the area ratio of a micro lens per unit area in a planar view.

The lower limit of the refractive index of the micro lens array 35 is preferably 1.3, and more preferably 1.45. Meanwhile, the upper limit of the refractive index of the micro lens array 35 is preferably 1.8, and more preferably 1.6. Furthermore, the refractive index of the micro lens array 35 is particularly preferably 1.5. When the refractive index of the micro lens array 35 falls within the aforementioned range, a lens-like refracting action of the micro lens array 35 is exhibited effectively, and optical functions such as light condensing of the micro lens sheet 33 is significantly improved.

The back layer 36 needs to transmit rays of light, the back layer 36 is formed to be transparent. The back layer 36 comprises a synthetic resin as a principal component. As the principal component of the back layer 36, a similar principal component to that of the back layer 13 of the aforementioned light diffusion sheet 5 can be used.

The plurality of protruding portions 36a are integrally molded with the back layer 36 by using the same principal component as the back layer 36 (In other words, the plurality of protruding portions 36a are formed integrally with the back layer 36.).

The plurality of protruding portions 36a correspond to the backmost face of the micro lens sheet 33. Each protruding portion 36a has a flattened semi-spherical shape or a flattened conical shape with a rounded apex, and, particularly in the present embodiment, a flattened half spheroidal shape. The plurality of protruding portions 36a are provided so as to protrude randomly (without regularity) on the back face of the back layer 36. The specific shape of the plurality of protruding portions 36a is similar to that of the plurality of protruding portions 13a of the light diffusion sheet 5.

The lower limit of the ratio of the average diameter of the protruding portions 36a to the average diameter $D_2$ of the micro lenses 35a is preferably 0.05, more preferably 0.07, and still more preferably 0.1. Meanwhile, the upper limit of the ratio is preferably 1, more preferably 0.5, and still more preferably 0.3. When the ratio is less than the lower limit, the amount of rays of light that are allowed to enter the protruding portions 36a may be insufficient and the rays of light may not be received sufficiently by the protruding portions 36a, and furthermore, the amount of rays of light that are subjected to mirror reflection on the back face of the back layer 36 of the micro lens sheet 33 may increase. To the contrary, when the ratio is greater than the upper limit, the curved shape of the protruding portion 36a is too smooth, and the rays of light may not be received sufficiently by the protruding portions 36a.

Production Method of Micro Lens Sheet

The micro lens sheet 33 can be produced by a resin film conveying step, an ultraviolet ray-curable resin composition supplying step, and an ultraviolet ray irradiating step similar to the production method of the aforementioned light diffusion sheet 5. Specifically, the production method of the micro lens sheet 33 is exemplified by (a) the procedure of applying an active energy ray-curable resin to the other lateral face of the resin film after the ultraviolet ray irradiating step, pressing the resultant film to a sheet die, a metal die, or a roll die having a reversed shape of the micro lens array 35 to transfer the shape onto the uncured active energy ray-curable resin, and irradiating an active energy ray to cure the active energy ray-curable resin, (b) the procedure of forming a reversed shape of the micro lens array 35 on the circumferential face of the other pressure roller and providing a resin in a molten state on the other lateral face of the resin film to transfer the shape, and the like. In addition, as the production method of the micro lens sheet, the plurality of protruding portions may be formed after forming the micro lens array 35.

Advantages

Since the micro lens sheet 33 comprises the plurality of protruding portions 36a provided scatteredly on the back face, as described above, the prevention of sticking with the other optical members provided on the back face side is enabled, and the prevention of scuffs from being produced on the front face of the other optical members is also enabled.

According to the production method of the micro lens sheet of the present application, as described above, the easy and reliable production of the micro lens sheet 33 in which the prevention of sticking with the other optical members provided on the back face side is enabled and the prevention of scuffs from being produced on the front face of the other optical members is also enabled, is enabled.

THIRD EMBODIMENT

Light Diffusion Sheet

Figure 8:
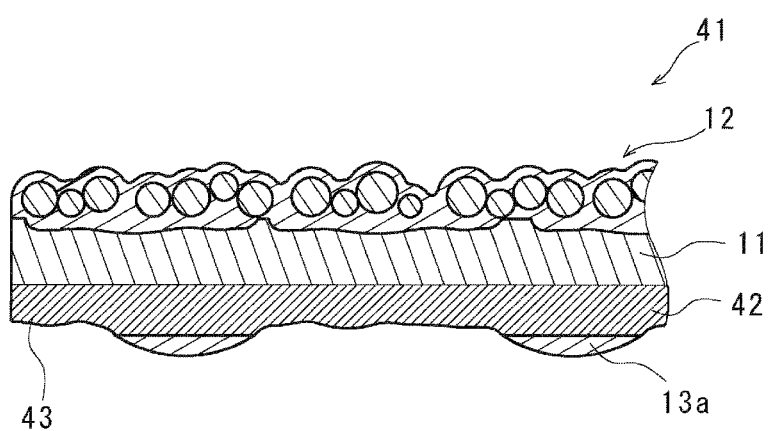
FIG. 8 is a schematic end view illustrating a light diffusion sheet according to a different embodiment from that of the light diffusion sheet of FIG. 2.

A light diffusion sheet 41 of FIG. 8 is used for the backlight unit 1 of FIG. 1 in place of the light diffusion sheet 5 of FIG. 2. The light diffusion sheet 41 comprises a substrate layer 11, a light diffusion layer 12 overlaid on the front face side of the substrate layer 11, and a back layer 42 overlaid on the back face side of the substrate layer 11. Furthermore, the light diffusion sheet 41 comprises a plurality of protruding portions 13a as sticking preventive parts provided scatteredly on the back face of the back layer 42. The plurality of protruding portions 13a is integrally molded with the back layer 42 (In other words, the plurality of protruding portions 13a are formed integrally with the back layer 42.). The light diffusion sheet 41 is formed in a rectangular shape in a planar view. The light diffusion sheet 41 consists of the substrate layer 11, the light diffusion layer 12, the back layer 42, and the plurality of protruding portions 13a (In other words, the light diffusion sheet 41 does not include any other layer than the substrate layer 11, the light diffusion layer 12, the back layer 42, and the plurality of protruding portions 13a.). Since the substrate layer 11, the light diffusion layer 12, and the plurality of protruding portions 13a of the light diffusion sheet 41 are similar to those of the light diffusion sheet 5 of FIG. 2, explanation thereof will be omitted through designating the identical number.

Since the back layer 42 needs to transmit rays of light, the back layer 42 is formed to be transparent. The back layer 42 comprises a synthetic resin as a principal component. As the principal component of the back layer 42, a similar principal component to that of the back layer 13 of the light diffusion sheet 5 can be used.

The light diffusion sheet 41 comprises a diffraction grating shape 43 with multiple rows that are oriented in a single direction, on the back face of the back layer 42 (the back face of the light diffusion sheet 41) in a region where the plurality of protruding portions 13a are absent. The diffraction grating shape 43 has a shape in which multiple uneven rows are formed along a single direction. Since the light diffusion sheet 41 comprises the diffraction grating shape 43, rays of light that reached the diffraction grating shape 43 can be allowed to diffuse in the width direction of this diffraction grating shape 43 (a vertical direction with respect to the average oriented direction of the multiple uneven rows). The diffraction grating shape 43 preferably comprises scratch-like rows or hair-line-like rows arranged in a single direction. According to the light diffusion sheet 41, since the diffraction grating shape 43 comprises scratch-like rows or hair-line-like rows arranged in a single direction, the easy and reliable diffusion of the rays of light in the width direction of this diffraction grating shape 43 is enabled. It is to be noted that the term "average oriented direction of multiple uneven rows" as referred to means an average oriented direction of the multiple recessed parts structuring the multiple uneven rows.

Figure 9:
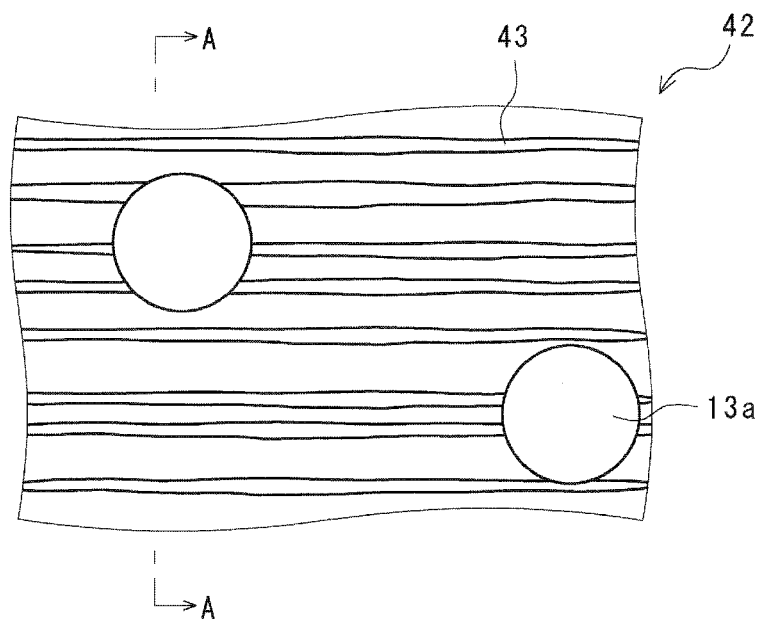
FIG. 9 is a schematic rear view illustrating the light diffusion sheet of FIG. 8.
Figure 10:
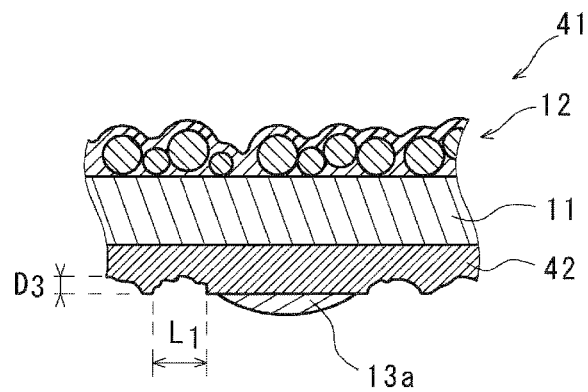
FIG. 10 is a partial end view of the light diffusion sheet of FIG. 8 along the line A-A in FIG. 9.

The diffraction grating shape 43 is formed substantially uniformly (in substantially equal density) over the entire region other than the plurality of protruding portions 13a on the back face of the back layer 42. Furthermore, as shown in FIGS. 9 and 10, with regard to the multiple uneven rows that form the diffraction grating shape 43, the longitudinal direction thereof is along the direction in parallel with one end of the back face of the back layer 42. Specifically, the longitudinal direction of the multiple uneven rows is along the direction of emitted rays of light from a light source (In other words, the multiple uneven rows are oriented in the direction in which the light source emits the rays of light). The upper limit of the inclination angle of each uneven row with respect to the direction of the emitted rays of light is preferably ±30°, more preferably ±15°, and still more preferably ±5°. Furthermore, each uneven row may be randomly oriented within the range of the aforementioned inclination angles (In other words, the orientation of each uneven row may not be identical to each other.). When each uneven row is randomly oriented, the inhibition of the occurrence of iridescent unevenness at a liquid crystal display device due to the multiple uneven rows is enabled. It is to be noted that, although each of the recessed parts of the multiple uneven rows is preferably formed independently for the purpose of controlling the diffusion direction of the rays of light, a part of the recessed parts may be crossed.

The recessed parts of the multiple uneven rows may be continuous in the longitudinal direction over the both ends of the back layer 42. However, for example, the average length of the recessed parts of the multiple uneven rows is preferably no greater than 10,000 times, and more preferably no greater than 5,000 times the average width of the recessed parts. Meanwhile, the lower limit of the average length of the recessed parts of the multiple uneven rows is preferably no less than double, and more preferably no less than triple the average width of the recessed parts. When the average length of the recessed parts of the multiple uneven rows is greater than the upper limit, the formation of the multiple uneven rows in randomly oriented directions as well as in a high density in order to inhibit the occurrence of iridescent unevenness at the liquid crystal display device may be difficult. To the contrary, when the average length of the recessed parts of the multiple uneven rows is less than the lower limit, the sufficient increase of the amount of rays of light that are allowed to diffuse in the width direction of the diffraction grating shape 43 with respect to the amount of rays of light that reached the diffraction grating shape 43 may not be enabled. It is to be noted that the term "average length of recessed parts of multiple uneven rows" as referred to means an averaged value of the lengths of arbitrarily extracted twenty recessed parts.

Furthermore, the length of the recessed parts of the multiple uneven rows is preferably random. Due to the lengths of the recessed parts of the multiple uneven rows being random, the light diffusion sheet 41 of the present application enables the inhibition of the occurrence of iridescent unevenness at the liquid crystal display device due to the multiple uneven rows.

The width $L_1$ of the recessed part of the multiple uneven rows is preferably random. Furthermore, as shown in FIG. 9, the width $L_1$ of the recessed part of each of the multiple uneven rows is preferably random along the longitudinal direction of the recessed part of the uneven rows. Due to the widths $L_1$ of the recessed parts of the multiple uneven rows being random along the longitudinal direction of the recessed part of the multiple uneven rows, the light diffusion sheet 41 of the present application enables the inhibition of the occurrence of iridescent unevenness at the liquid crystal display device due to the multiple uneven rows.

The lower limit of the average width of the recessed parts of the multiple uneven rows is preferably 10 nm, more preferably 50 nm, and still more preferably 100 nm. Meanwhile, the upper limit of the average width of the recessed parts of the multiple uneven rows is preferably 30 μm, more preferably 20 μm, and still more preferably 10 μm. When the average width of the recessed parts of the multiple uneven rows is less than the lower limit, moldability of the diffraction grating shape 43 may be deteriorated. To the contrary, when the average width of the recessed parts of the multiple uneven rows is greater than the upper limit, the amount of rays of light that are allowed to diffuse in the width direction of the diffraction grating shape 43 may not be secured sufficiently. It is to be noted that the width of the recessed part of each uneven row is preferably formed randomly along the longitudinal direction within the aforementioned range. When the width of the recessed part of each uneven row is formed randomly within the aforementioned range, the prevention of moire from being produced by the interference of other optical members (a prism sheet, a liquid crystal cell, etc.) having a cyclic pitch is enabled, and the prevention of a regular occurrence of color separation is also enabled, leading to the prevention of iridescent unevenness, etc. It is to be noted that the term "average width of recessed parts of multiple uneven rows" as referred to means an averaged value of the widths at average interfaces of the apexes of the recessed parts of the multiple uneven rows at arbitrary points (except for the both end parts in the longitudinal direction) of arbitrarily extracted twenty recessed parts.

The pitch of the multiple uneven rows is preferably random. Due to the pitch of the multiple uneven rows being random, the light diffusion sheet 41 of the present application enables the inhibition of the occurrence of iridescent unevenness at the liquid crystal display device due to the multiple uneven rows. It is to be noted that the term "average pitch of multiple uneven rows" as referred to means an averaged value of pitches of twenty uneven rows which are adjacent on the linear line perpendicular to the average oriented direction of the multiple uneven rows.

The lower limit of the average pitch of the multiple uneven rows is preferably 10 nm, more preferably 50 nm, and still more preferably 100 nm. Meanwhile, the upper limit of the average pitch of the multiple uneven rows is preferably 40 μm, more preferably 30 μm, still more preferably 20 μm, and particularly preferably 10 μm. When the average pitch of the multiple uneven rows is less than the lower limit, moldability of the diffraction grating shape 43 may be deteriorated. To the contrary, when the average pitch of the multiple uneven rows is greater than the upper limit, the sufficient increase of the amount of rays of light that are allowed to diffuse in the width direction of the diffraction grating shape 43 may not be enabled.

The upper limit of the standard deviation of the pitches of the multiple uneven rows is preferably 10 μm, more preferably 9 μm, and still more preferably 7 μm. When the standard deviation of the pitches of the multiple uneven rows is greater than the upper limit, the pitches of the multiple uneven rows are too dispersed, and the uniform increase of the amount of rays of light that are allowed to diffuse in the width direction of the diffraction grating shape 43 over the entire formation region of the multiple uneven rows may not be enabled. Meanwhile, the lower limit of the standard deviation of the pitches of the multiple uneven rows can be set to be 4 μm, for example, since the provision of the multiple uneven rows in a comparatively random direction is easy. It is to be noted that the term "standard deviation of pitches of multiple uneven rows" as referred to means a standard deviation of pitches of arbitrarily extracted twenty uneven rows.

The lower limit of the average number of existing recessed parts of the multiple uneven rows per unit length in a vertical direction in the average oriented direction of the multiple uneven rows is preferably 10/mm, more preferably 50/mm, and still more preferably 100/mm. Meanwhile, the upper limit of the average number of existing recessed parts is preferably 10,000/mm, more preferably 5,000/mm, and still more preferably 1,000/mm. When the average number of existing recessed parts is lower than the lower limit, the sufficient increase of the amount of rays of light that are allowed to diffuse in the width direction of the diffraction grating shape 43 with respect to the amount of rays of light that reached the diffraction grating shape 43 may not be enabled. To the contrary, when the average number of existing recessed parts is greater than the upper limit, moldability of the diffraction grating shape 43 may be deteriorated.

The lower limit of the average depth $D_3$ of the recessed parts of the multiple uneven rows is preferably 10 nm, more preferably 500 nm, still more preferably 1 μm, and particularly preferably 2 μm. Meanwhile, the upper limit of the average depth $D_3$ is preferably 10 μm, more preferably 5 μm, and still more preferably 3 μm. When the average depth $D_3$ is less than the lower limit, the sufficient increase of the amount of rays of light that are allowed to diffuse in the width direction of the diffraction grating shape 43 may not be enabled. To the contrary, when the average depth $D_3$ is greater than the upper limit, the strength of the back layer 42 may be deteriorated. It is to be noted that the term "average depth of recessed parts of multiple uneven rows" as referred to means an averaged value of depths from the average interfaces of the apexes of the recessed parts of the multiple uneven rows to the bottoms of arbitrarily extracted twenty recessed parts.

Furthermore, the upper limit of the standard deviation of the depths of the recessed parts of the multiple uneven rows is preferably 4 μm, more preferably 3 μm, and still more preferably 2.5 μm. When the standard deviation of the depths is greater than the upper limit, the depths of the recessed parts of the multiple uneven rows are too dispersed, and the uniform increase of the amount of rays of light that are allowed to diffuse in the width direction of the diffraction grating shape 43 over the entire formation region of the multiple uneven rows may not be enabled. Meanwhile, the lower limit of the standard deviation of the depths is not particularly limited, and, for example, can be set to be 0.3 μm. It is to be noted that the term "standard deviation of depths of multiple uneven rows" as referred to means a standard deviation of depths of recessed parts of arbitrarily extracted twenty uneven rows.

The lower limit of the arithmetic average roughness (Ra) with respect to directions parallel to the oriented directions of the multiple uneven rows on the external face on which the diffraction grating shape 43 is formed (the back face of the back layer 42 in which the plurality of protruding portions 13a are not formed) is preferably 0.005 μm, more preferably 0.05 μm, and still more preferably 0.1 μm. Meanwhile, the upper limit of the arithmetic average roughness (Ra) with respect to the directions parallel to the oriented directions of the multiple uneven rows on the external face on which the diffraction grating shape 43 is formed (the back face of the back layer 42 in which the plurality of protruding portions 13a are not formed) is preferably 1.5 μm, more preferably 1.2 μm, and still more preferably 1 μm. When the arithmetic average roughness (Ra) is less than the lower limit, the inhibitory effect to the generation of hot spots (described later) may be insufficient. To the contrary, when the arithmetic average roughness (Ra) is greater than the upper limit, the amount of rays of light that are allowed to diffuse in directions parallel to the oriented directions of the multiple uneven rows with respect to the amount of rays of light that are allowed to diffuse in the width direction of the diffraction grating shape 43 may increase, and the viewing angle in the vertical direction with respect to the direction of emitted rays of light from the light source may not be secured sufficiently. It is to be noted that the term "arithmetic average roughness (Ra)" as referred to means a value of cut-off (λc): 0.8 mm; and evaluation length: 4 mm, as determined according to JIS-B0601:1994.

The lower limit of the arithmetic average roughness (Ra) with respect to directions vertical to the oriented directions of the multiple uneven rows on the external face on which the diffraction grating shape 43 is formed (the back face of the back layer 42 in which the plurality of protruding portions 13a are not formed) is preferably 0.01 μm, more preferably 0.1 μm, and still more preferably, 0.5. Meanwhile, the upper limit of the arithmetic average roughness (Ra) with respect to the directions vertical to the oriented directions of the multiple uneven rows on the external face on which the diffraction grating shape 43 is formed (the back face of the back layer 42 in which the plurality of protruding portions 13a are not formed) is preferably 5 μm, more preferably 3 μm, and still more preferably 1.5 μm. When the arithmetic average roughness (Ra) is less than the lower limit, the sufficient increase of the amount of rays of light that are allowed to diffuse in the width direction of the diffraction grating shape 43 may not be enabled. To the contrary, when the arithmetic average roughness (Ra) is greater than the upper limit, the control of an emitting angle of the rays of light may be difficult.

Furthermore, both of the arithmetic average roughness (Ra) with respect to directions parallel to the oriented directions of the multiple uneven rows and the arithmetic average roughness (Ra) with respect to directions vertical to the oriented directions of the multiple uneven rows on the external face on which the diffraction grating shape 43 is formed (the back face of the back layer 42 in which the plurality of protruding portions 13a are not formed) preferably fall within the aforementioned range. According to the light diffusion sheet 41, when the arithmetic average roughness (Ra) with respect to directions parallel to the oriented directions of the multiple uneven rows and the arithmetic average roughness (Ra) with respect to directions vertical to the oriented directions of the multiple uneven rows fall within the aforementioned range, the sufficient increase of the amount of the rays of light that are allowed to diffuse in the width direction of the diffraction grating shape 43 is enabled, and the viewing angle in the vertical direction with respect to the direction of emitted rays of light from the light source can be easily widened sufficiently.

The lower limit of the difference between the arithmetic average roughness (Ra) with respect to directions vertical to the oriented directions of the multiple uneven rows and the arithmetic average roughness (Ra) with respect to directions parallel to the oriented directions of the multiple uneven rows on the external face on which the diffraction grating shape 43 is formed (the back face of the back layer 42 in which the plurality of protruding portions 13a are not formed) is preferably 0.5 μm, more preferably 0.7 μm, and still more preferably 1 μm. When the difference of the arithmetic average roughness (Ra) is no less than the lower limit, the sufficient increase of the amount of the rays of light that are allowed to diffuse in the width direction of the diffraction grating shape 43 is enabled, and the viewing angle in the vertical direction with respect to the direction of emitted rays of light from the light source can be easily widened sufficiently. Meanwhile, the upper limit of the difference of the arithmetic average roughness (Ra) can be set to be 1.9 μm, for example.

The lower limit of the maximum height (Ry) with respect to directions parallel to the oriented directions of the multiple uneven rows on the external face on which the diffraction grating shape 43 is formed (the back face of the back layer 42 in which the plurality of protruding portions 13*a* are not formed) is preferably 0.1 μm, more preferably 1 μm, and still more preferably 1.5 μm. Meanwhile, the upper limit of the maximum height (Ry) with respect to directions parallel to the oriented directions of the multiple uneven rows on the external face on which the diffraction grating shape 43 is formed (the back face of the back layer 42 in which the plurality of protruding portions 13*a* are not formed) is preferably 3 μm, more preferably 2.5 μm, and still more preferably 2 μm. When the maximum height (Ry) is less than the lower limit, the inhibitory effect to the generation of hot spots may be insufficient. To the contrary, when the maximum height (Ry) is greater than the upper limit, the amount of rays of light that are allowed to diffuse in directions parallel to the oriented directions of the multiple uneven rows with respect to the amount of rays of light that are allowed to diffuse in the width direction of the diffraction grating shape 43 may increase, and the viewing angle in the vertical direction with respect to the direction of emitted rays of light from the light source may not be secured sufficiently. It is to be noted that the term "maximum height (Ry)" as referred to means a value of cut-off (λc): 0.8 mm; and evaluation length: 4 mm, as determined according to JIS-B0601:1994.

The lower limit of the maximum height (Ry) with respect to directions vertical to the oriented direction of the multiple uneven rows on the external face on which the diffraction grating shape 43 is formed (the back face of the back layer 42 in which the plurality of protruding portions 13*a* are not formed) is preferably 4 μm, more preferably 5 μm, and still more preferably 6 μm. Meanwhile, the upper limit of the maximum height (Ry) with respect to directions vertical to the oriented directions of the multiple uneven rows on the external face on which the diffraction grating shape 43 is formed (the back face of the back layer 42 in which the plurality of protruding portions 13*a* are not formed) is preferably 12 μm, more preferably 10 μm, and still more preferably 9 μm. When the maximum height (Ry) is less than the lower limit, the sufficient increase of the amount of rays of light that are allowed to diffuse in the width direction of the diffraction grating shape 43 may not be enabled. To the contrary, when the maximum height (Ry) is greater than the upper limit, the control of an emitting angle of the rays of light may be difficult.

The lower limit of the difference between the maximum height (Ry) with respect to directions vertical to the oriented directions of the multiple uneven rows and the maximum height (Ry) with respect to directions parallel to the oriented directions of the multiple uneven rows on the external face on which the diffraction grating shape 43 is formed (the back face of the back layer 42 in which the plurality of protruding portions 13*a* are not formed) is preferably 4 μm, more preferably 5 μm, and still more preferably 6 μm. When the difference of the maximum heights (Ry) is no less than the lower limit, the sufficient increase of the amount of the rays of light that are allowed to diffuse in the width direction of the diffraction grating shape 43 is enabled, and the viewing angle in the vertical direction with respect to the direction of emitted rays of light from the light source can be easily widened sufficiently. Meanwhile, the upper limit of the difference of the maximum heights (Ry) can be set to be 11 μm, for example.

The lower limit of the ten-point average roughness (Rz) with respect to directions parallel to the oriented directions of the multiple uneven rows on the external face on which the diffraction grating shape 43 is formed (the back face of the back layer 42 in which the plurality of protruding portions 13*a* are not formed) is preferably 0.1 μm, more preferably 0.5 μm, and still more preferably 1 μm. Meanwhile, the upper limit of the ten-point average roughness (Rz) with respect to directions parallel to the oriented directions of the multiple uneven rows on the external face on which the diffraction grating shape 43 is formed (the back face of the back layer 42 in which the plurality of protruding portions 13*a* are not formed) is preferably 2.5 μm, more preferably 2 μm, and still more preferably 1.5 μm. When the ten-point average roughness (Rz) is less than the lower limit, the inhibitory effect to the generation of hot spots may be insufficient. To the contrary, when the ten-point average roughness (Rz) is greater than the upper limit, the amount of rays of light that are allowed to diffuse in directions parallel to the oriented directions of the multiple uneven rows with respect to the amount of rays of light that are allowed to diffuse in the width direction of the diffraction grating shape 43 may increase, and the viewing angle in the vertical direction with respect to the direction of emitted rays of light from the light source may not be secured sufficiently. It is to be noted that the term "ten-point average roughness (Rz)" as referred to means a value of cut-off (λc): 0.8 mm; and evaluation length: 4 mm, as determined according to JIS-B0601:1994.

The lower limit of the ten-point average roughness (Rz) with respect to directions vertical to the oriented directions of the multiple uneven rows on the external face on which the diffraction grating shape 43 is formed (the back face of the back layer 42 in which the plurality of protruding portions 13*a* are not formed) is preferably 4 μm, more preferably 5 μm, and still more preferably 6 μm. Meanwhile, the upper limit of the ten-point average roughness (Rz) with respect to directions vertical to the oriented directions of the multiple uneven rows on the external face on which the diffraction grating shape 43 is formed (the back face of the back layer 42 in which the plurality of protruding portions 13*a* are not formed) is preferably 10 μm, more preferably 8 μm, and still more preferably 7 μm. When the ten-point average roughness (Rz) is less than the lower limit, the sufficient increase of the amount of rays of light that are allowed to diffuse in the width direction of the diffraction grating shape 43 may not be enabled. To the contrary, when the ten-point average roughness (Rz) is greater than the upper limit, the control of an emitting angle of the rays of light may be difficult.

The lower limit of the difference between the ten-point average roughness (Rz) with respect to directions vertical to the oriented directions of the multiple uneven rows and the ten-point average roughness (Rz) with respect to directions parallel to the oriented directions of the multiple uneven rows on the external face on which the diffraction grating shape 43 is formed (the back face of the back layer 42 in which the plurality of protruding portions 13*a* are not formed) is preferably 3 μm, more preferably 4 μm, and still more preferably 4.5 μm. When the difference of the ten-point average roughness (Rz) is no less than the lower limit, the sufficient increase of the amount of the rays of light that are allowed to diffuse in the width direction of the diffraction grating shape 43 is enabled, and the viewing angle in the vertical direction with respect to the direction of emitted rays of light from the light source can be easily widened sufficiently. Meanwhile, the upper limit of the difference of the ten-point average roughness (Rz) can be set to be 9 μm, for example.

The lower limit of the root-mean-square slope (RΔq) with respect to directions parallel to the oriented directions of the multiple uneven rows on the external face on which the diffraction grating shape 43 is formed (the back face of the back layer 42 in which the plurality of protruding portions 13a are not formed) is preferably 0.05, more preferably 0.2, still more preferably 0.25, and particularly preferably 0.3. Meanwhile, the upper limit of the root-mean-square slope (RΔq) with respect to directions parallel to the oriented directions of the multiple uneven rows on the external face on which the diffraction grating shape 43 is formed (the back face of the back layer 42 in which the plurality of protruding portions 13a are not formed) is preferably 0.5, more preferably 0.45, and still more preferably 0.4. When the root-mean-square slope (RΔq) is less than the lower limit, the inhibitory effect to the generation of hot spots may be insufficient. To the contrary, when the root-mean-square slope (RΔq) is greater than the upper limit, the amount of rays of light that are allowed to diffuse in directions parallel to the oriented directions of the multiple uneven rows with respect to the amount of rays of light that are allowed to diffuse in the width direction of the diffraction grating shape 43 may increase, and the viewing angle in the vertical direction with respect to the direction of emitted rays of light from the light source may not be secured sufficiently. It is to be noted that the term "root-mean-square slope (RΔq)" as referred to means a value determined according to JIS-B0601:1994.

The lower limit of the root-mean-square slope (RΔq) with respect to directions vertical to the oriented directions of the multiple uneven rows on the external face on which the diffraction grating shape 43 is formed (the back face of the back layer 42 in which the plurality of protruding portions 13a are not formed) is preferably 0.5, more preferably 0.7, and still more preferably 1. Meanwhile, the upper limit of the root-mean-square slope (RΔq) with respect to directions vertical to the oriented directions of the multiple uneven rows on the external face on which the diffraction grating shape 43 is formed (the back face of the back layer 42 in which the plurality of protruding portions 13a are not formed) is preferably 2.5, more preferably 2, and still more preferably 1.8. When the root-mean-square slope (RΔq) is less than the lower limit, the sufficient increase of the amount of rays of light that are allowed to diffuse in the width direction of the diffraction grating shape 43 may not be enabled. To the contrary, when the root-mean-square slope (RΔAq) is greater than the upper limit, the control of an emitting angle of the rays of light may be difficult.

The lower limit of the difference between the root-mean-square slope (RΔq) with respect to directions vertical to the oriented directions of the multiple uneven rows and the root-mean-square slope (RΔq) with respect to directions parallel to the oriented directions of the multiple uneven rows on the external face on which the diffraction grating shape 43 is formed (the back face of the back layer 42 in which the plurality of protruding portions 13a are not formed) is preferably 0.5, more preferably 0.7, and still more preferably 1. When the difference of the root-mean-square slopes (RΔq) is no less than the lower limit, the sufficient increase of the amount of the rays of light that are allowed to diffuse in the width direction of the diffraction grating shape 43 is enabled, and the viewing angle in the vertical direction with respect to the direction of emitted rays of light from the light source can be easily widened sufficiently. Meanwhile, the upper limit of the difference of the root-mean-square slopes (RΔq) can be set to be 2.2, for example.

Function of Reducing Lack in Uniformity of Luminance

Figure 11:
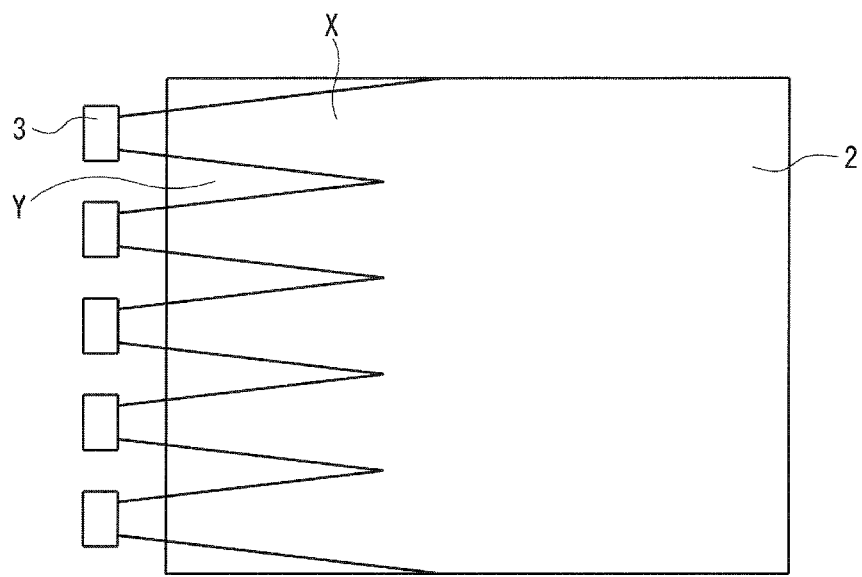
FIG. 11 is a schematic plan view illustrating hot spots in a backlight unit for a liquid crystal display device.
Figure 12:
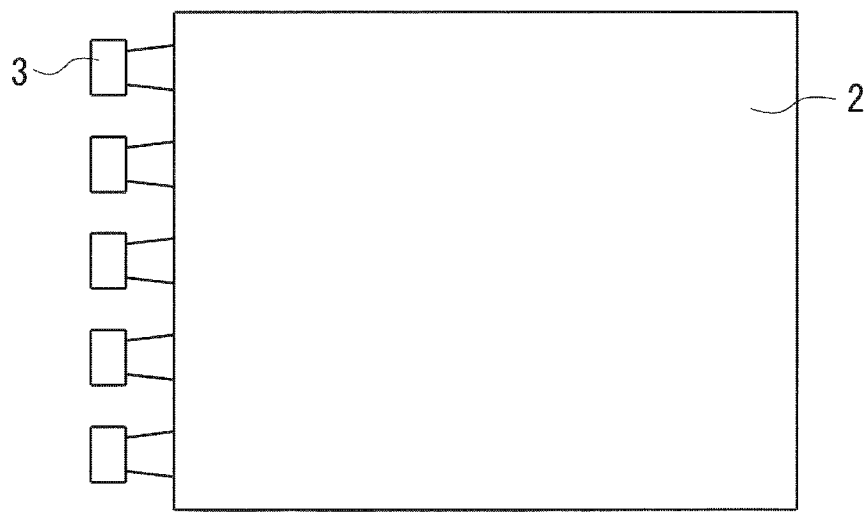
FIG. 12 is a schematic view for explaining a function of reducing a lack in uniformity of the luminance provided by the light diffusion sheet of FIG. 8.

Next, with reference to FIGS. 11 and 12, a function of reducing a lack in uniformity of the luminance provided by the light diffusion sheet 41 and the backlight unit comprising the light diffusion sheet 41 will be explained. First, with reference to FIG. 11, the amount of rays of light that are emitted from a plurality of LED light sources 3 of the backlight unit 1 of FIG. 1 and allowed to enter the light guide film 2 will be explained. The rays of light that are emitted from the plurality of LED light sources 3 are allowed to enter substantially vertically from an end face (end face of incidence) that faces the plurality of LED light sources 3 of the light guide film 2 and to propagate toward the end face that faces this end face of incidence. During this procedure, since the rays of light emitted from the plurality of LED light sources 3 are highly directive, regions X in which the amount of rays of light is extremely high are generated particularly in the vicinity of rays of light-incident parts of the light guide film 2. Meanwhile, since the plurality of LED light sources 3 are provided so as to be spaced in a predetermined interval, regions Y in which the amount of rays of light is extremely low are generated among the vicinity of rays of light-incident parts of the light guide film 2 (among the adjacent regions X).

Subsequently, with reference to FIG. 12, a function of reducing a lack in uniformity of the luminance provided by the light diffusion sheet 41 and the backlight unit comprising the light diffusion sheet 41 will be explained. Most of the rays of light that are allowed to exit from the aforementioned regions X to the front face side of the light guide film 2 are allowed to enter the back face of the back layer 42 of the light diffusion sheet 41 in a state along a direction of emitted rays of light from the plurality of LED light sources. Then, it is inferred that the rays of light that are allowed to enter the back face of the back layer 42 of the light diffusion sheet 41 would be allowed to diffuse in the width direction of the diffraction grating shape 43 by the diffraction grating shape 43 comprising the plurality of uneven rows along the direction of emitted rays of light from the plurality of LED light sources 3. In other words, as shown in FIG. 12, it is inferred that the rays of light that were allowed to enter the diffraction grating shape 43 would be allowed to diffuse in the direction of the regions Y in a planar view. With such a configuration, it is inferred that the amount of rays of light of the regions X and the amount of rays of light of the regions Y in a planar view would be uniformized, and lack in uniformity of the luminance in the backlight unit would be reduced.

Production Method of Light Diffusion Sheet

Next, the production method of the light diffusion sheet 41 will be explained. The production method of the light diffusion sheet 41 comprises a resin film conveying step; an ultraviolet ray-curable resin composition supplying step; and an ultraviolet ray irradiating step. Furthermore, the production method of the light diffusion sheet 41 comprises a step of overlaying a light diffusion layer. The production of the light diffusion sheet 41 is enabled by a similar method to the production method of the aforementioned light diffusion sheet 5 except that a pressure roller having on a front face a reversed shape of the back face shape comprising the plurality of protruding portions 13a and the diffraction grating shape 43 is employed in place of the one pressure roller 23.

Advantages

Since the light diffusion sheet 41 comprises the plurality of protruding portions 13a and 18a provided scatteredly on the back face, as described above, the prevention of sticking with the other optical members disposed on the back face side is enabled, and the prevention of scuffs from being produced on the front face of the other optical members is also enabled. Furthermore, since the light diffusion sheet 41 comprises the diffraction grating shape 43 with multiple rows that are oriented on the back face in a single direction in a region where the plurality of protruding portions 13a are absent, the rays of light can be allowed to diffuse in the width direction of this diffraction grating shape 43, and thus, the viewing angle in the width direction can be secured sufficiently.

According to the production method of the light diffusion sheet of the present application, as described above, the easy and reliable production of the light diffusion sheet 41 in which the prevention of sticking with the other optical members disposed on the back face side is enabled, the prevention of scuffs from being produced on the front face of the other optical members is also enabled, and the viewing angle in the width direction of the diffraction grating shape 43 can be secured sufficiently, is enabled.

FOURTH EMBODIMENT

Light Diffusion Sheet

Figure 13:
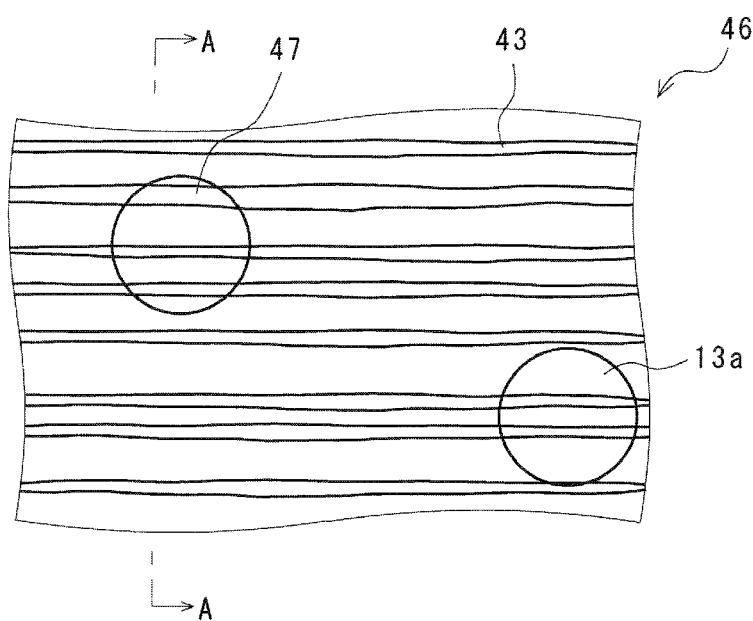
FIG. 13 is a schematic rear view illustrating a light diffusion sheet according to a different embodiment from that of the light diffusion sheet of FIG. 2 or FIG. 8.

A light diffusion sheet 46 of FIG. 13 is used for backlight unit of FIG. 1 in place of the light diffusion sheets 5, 41 of FIG. 2 and FIG. 8. The light diffusion sheet 46 is structured similar to the light diffusion sheet 41 of FIG. 8 except that a diffraction grating shape 47 that is continuous with the diffraction grating shape 43 is provided also on the back face side of the plurality of protruding portions 13a.

Production Method of Light Diffusion Sheet

The production method of the light diffusion sheet 46 comprises a resin film conveying step; an ultraviolet ray-curable resin composition supplying step; and an ultraviolet ray irradiating step. Furthermore, the production method of the light diffusion sheet 46 comprises a light diffusion layer laminating step. The production of the light diffusion sheet 46 is enabled by a similar method to the production method of the aforementioned light diffusion sheet 5 except that a pressure roller having, on a front face, a reversed shape of the back face shape comprising the plurality of protruding portions 13a, the diffraction grating shape 43, and the diffraction grating shape 47 that is continuous with the diffraction grating shape 43 and provided on the back face side of the plurality of protruding portions 13a, is employed in place of the one pressure roller 23.

Advantages

Since the light diffusion sheet 46 comprises the diffraction grating shape 47 that is continuous with the diffraction grating shape 43 also on the back face side of the plurality of protruding portions 13a, rays of light can be allowed to diffuse uniformly in the width direction of the diffraction grating shapes 43, 47, and the viewing angle in the width direction of the diffraction grating shapes 43 and 47 can be secured appropriately.

According to the production method of the light diffusion sheet of the present application, as described above, the easy and reliable production of the light diffusion sheet 46 in which the prevention of sticking with the other optical members disposed on the back face side is enabled, the prevention of scuffs from being produced on the front face of the other optical members is also enabled, and the viewing angle in the width direction of the diffraction grating shapes 43 and 47 can be secured appropriately, is enabled.

OTHER EMBODIMENTS

It is to be noted that the optical sheet, the backlight unit, and the production method of the optical sheet according to the present invention may be exploited in various modified or improved embodiments other than those as described above. For example, the optical sheet according to the present application is not limited to the light diffusion sheet, the prism sheet, and the micro lens sheet comprising the aforementioned structures. For example, the optical sheet according to the present application may be a light diffusion sheet having micro uneven shapes formed on the front face of the light diffusion layer by the emboss processing. Furthermore, in a case where the optical sheet is a light diffusion sheet, the light diffusion sheet is not necessarily a light diffusion sheet for use at the bottom provided immediately above an optical waveguide sheet, and may be a light diffusion sheet for use at the top that is provided on the front face side of a prism sheet and inhibits lack in uniformity of the luminance due to a shape of a prism array, etc. of the prism sheet by allowing rays of light to diffuse slightly. It is to be noted that, in a case where the optical sheet is the light diffusion sheet for use at the top and has a diffraction grating shape, since an optical path in which rays of light are emitted from a light source and allowed to enter a diffraction grating shape can be comparatively elongated, the diffusion effect of rays of light in the width direction of the diffraction grating shape can be easily enhanced. Therefore, when the optical sheet is a light diffusion sheet for use at the top, the inhibitory effect to lack in uniformity of the luminance in the backlight unit can be easily enhanced.

The optical sheet according to the present application may comprise other layer than the layers described in the embodiments. For example, in the optical sheet, other resin layer may be interposed between the substrate layer and the optical layer (the light diffusion layer, the prism array, the micro lens array) or between the substrate layer and the back layer.

When the optical sheet comprises a diffraction grating shape, the optical sheet is preferably disposed on a back face of a sheet body structured by laminating two prism sheets. Since, in the sheet body structured by laminating two prism sheets, the formation of an air space between the prism sheets is difficult, and thus, opacifying properties thereof is low. On the other hand, since, in the backlight unit in which the optical sheet is provided on the back face of the sheet body, the optical sheet can allow rays of light to diffuse in the width direction of a diffraction grating shape, the opacifying properties thereof can be improved sufficiently.

According to the optical sheet of the present application, a diffraction grating shape may be formed on other part than the back face. For example, according to the optical sheet, a diffraction grating shape may be formed on a front face of a substrate layer or a back face of the optical layer (a light diffusion layer, a prism array, a micro lens array).

Figure 14:
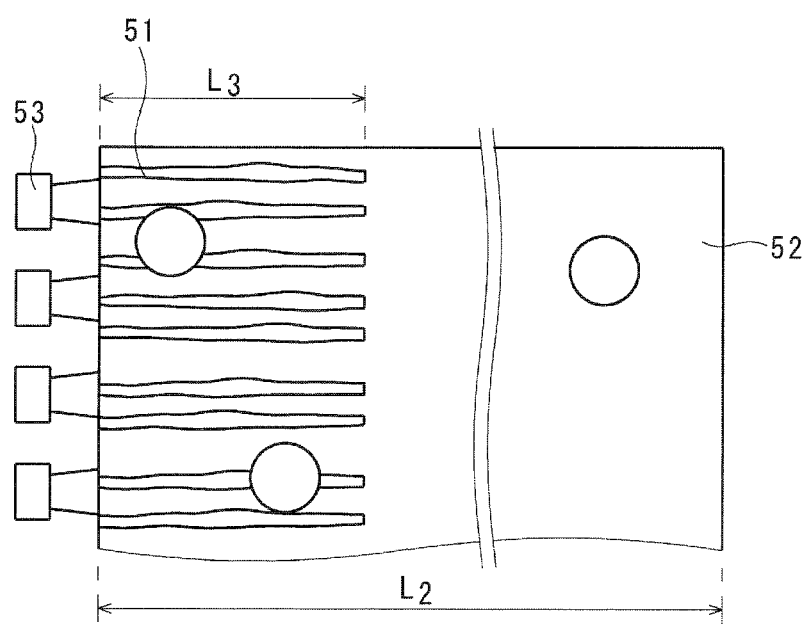
FIG. 14 is a schematic rear view illustrating an optical sheet according to another embodiment of the present invention.

The diffraction grating shape may be provided as shown in FIG. 14, for example. In FIG. 14, a diffraction grating shape 51 is formed in a certain region from one end (an end edge of a side facing a light source 53 in a planar view) to the other end side of the back layer 52. Furthermore, a region where the diffraction grating shape 51 on the back face of the back layer 52 is not formed is structured as a flat face. It is to be noted that the specific structure of the diffraction grating shape 51 is similar to that of the light diffusion sheet 41 of FIG. 8.

The lower limit of the ratio ($L_3/L_2$) of the length $L_3$ between one end and the other end in the region where the diffraction grating shape 51 is formed to the length $L_2$ between one end and the other end of the back face of the back layer 52 is preferably 0.15, more preferably 0.2, and still more preferably 0.25. Meanwhile, the upper limit of the length ratio ($L_3/L_2$) is preferably 0.5, more preferably 0.45, and still more preferably 0.4. When the length ratio ($L_3/L_2$) is less than the lower limit, the entire inhibition of the generation of hot spots may be difficult. To the contrary, when the length ratio ($L_3/L_2$) is greater than the upper limit, the rays of light in other region than the hot spots may be allowed to easily diffuse in the width direction of the diffraction grating shape 51.

Figure 15:
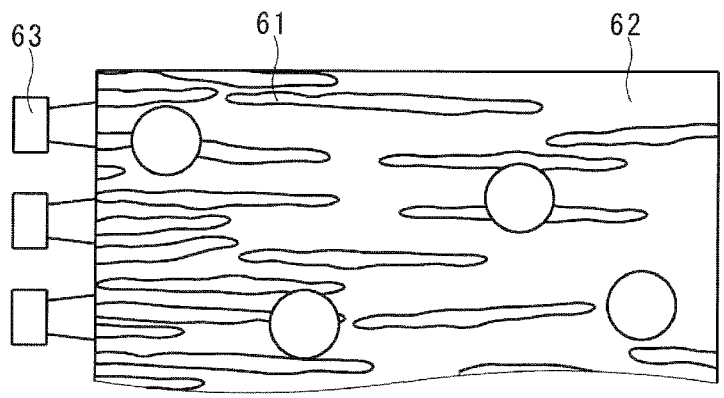
FIG. 15 is a schematic rear view illustrating a different optical sheet from that of FIG. 14.

Furthermore, the diffraction grating shape may be provided as shown in FIG. 15, for example. With regard to the diffraction grating shape 61 of FIG. 15, the presence ratio of uneven shapes gradually decreases from one end (an end edge on a side facing a light source 63 in a planar view) toward the other end side of the back face of the back layer 62. According to the optical sheet of the present application with such a structure as well, the inhibition of the generation of hot spots is enabled. Furthermore, according to the optical sheet, since the presence ratio of uneven shapes gradually decreases from the end edge facing the light source 63 toward the other end side, the amount of rays of light that are allowed to diffuse in the width direction of the diffraction grating shape 61 other than the hot spots can be reduced.

Figure 16:
FIG. 16 is a schematic end view illustrating a diffraction grating shape according to another embodiment of the present invention.
Figure 17:
FIG. 17 is a schematic end view illustrating a diffraction grating shape according to a different form from the diffraction grating shape of FIG. 16.
Figure 18:
FIG. 18 is a schematic end view illustrating a diffraction grating shape according to a different form from the diffraction grating shape of FIG. 16 or FIG. 17.
Figure 19:
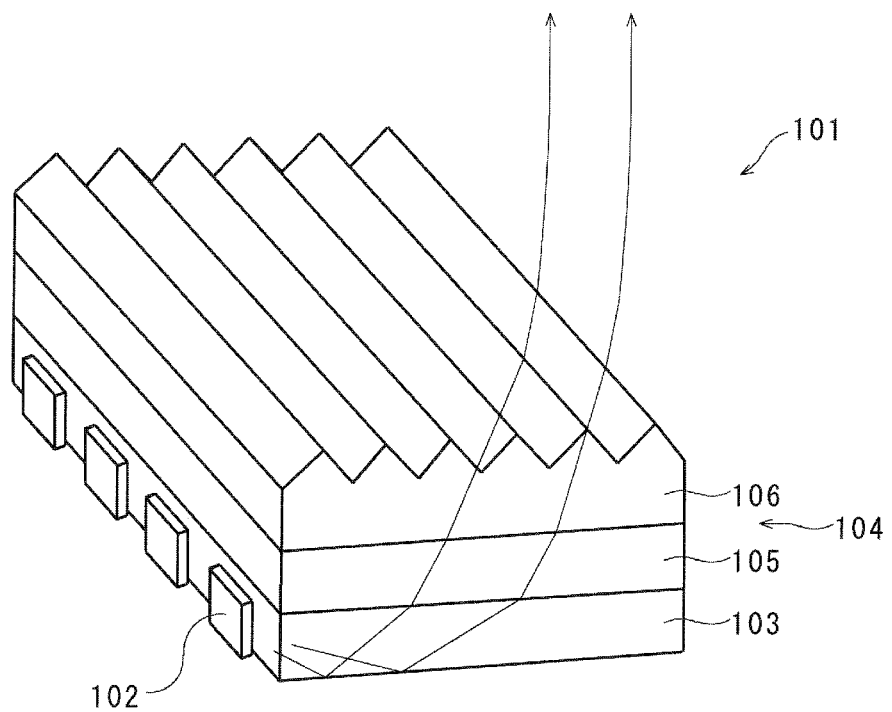
FIG. 19 is a schematic perspective view illustrating a conventional edge-lit backlight unit.
Figure 20:
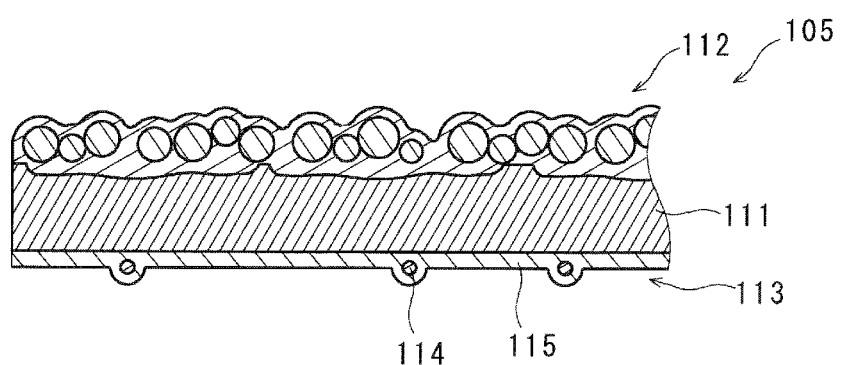
FIG. 20 is a schematic end view illustrating a conventional light diffusion sheet.

The specific shape of the diffraction grating shape is not limited to the shapes of the aforementioned embodiments, and, for example, may be a shape having squared U-shaped recessed parts in cross section as shown in FIG. 16, a shape having triangular recessed parts in cross section as shown in FIG. 17, a shape having slit-like recessed parts as shown in FIG. 18, and the like. Furthermore, the multiple uneven rows may be oriented in a direction vertical to a direction of emitted rays of light from a light source.

Although the backlight unit preferably comprises a plurality of LED light sources, it also preferably has only one LED light source. Furthermore, the specific type of the optical sheet in the backlight unit is not particularly limited. Although the backlight unit preferably has a plurality of optical sheets on the front face side of an optical waveguide sheet, it also preferably has only one optical sheet.

The waveguide sheet may not necessarily be the aforementioned light guide film, and, for example, may be a comparatively thick light guide plate.

The backlight unit may not necessarily be an edge-lit backlight unit, and may be a direct-lit backlight unit.

Furthermore, even in a case where the backlight unit is an edge-lit backlight unit, it is not necessarily a unilateral edge-lit backlight unit in which LED light sources are provided along only one end face of an optical waveguide sheet, and may be a bilateral edge-lit backlight unit in which LED light sources are provided along a pair of opposite end faces of the optical waveguide sheet or an entire circumference edge-lit backlight unit in which LED light sources are provided along each end face of the optical waveguide sheet.

The backlight unit according to the present application can be used for a comparatively large visual display unit such as a personal computer and a liquid crystal television, a mobile phone terminal such as smartphone, a mobile information terminal such as a tablet terminal, and the like.

EXAMPLES

Hereinafter, the embodiment of the present invention will be explained in detail by way of Examples, but the present invention is not in any way limited to these Examples.

No. 1

A light diffusion sheet was produced by using the production apparatus 21 of FIG. 5 in which a plurality of identically shaped recessed parts were formed substantially in equal density on the circumferential face of the one pressure roller 23. First, a resin film containing an acrylic urethane resin as a principal component and for forming a substrate layer of a light diffusion sheet was conveyed between the pair of pressure rollers 22, 23. Then, an ultraviolet ray-curable resin composition containing an acrylic urethane resin as a principal component was supplied between the resin film and the one pressure roller 23, followed by pressing the resin film and the ultraviolet ray-curable resin composition by the pair of pressure rollers 22, 23. With this procedure, a plurality of half spheroidal shape-like protruding portions which were reversed shapes of a plurality of protruding portions were transferred onto an external face of the ultraviolet ray-curable resin composition. Furthermore, the ultraviolet ray-curable resin composition on which the plurality of protruding portions were transferred was irradiated with ultraviolet rays, followed by curing the ultraviolet ray-curable resin composition. Subsequently, a coating liquid comprising a plurality of beads and a binder composition was applied on the face of an opposite side to the side where the ultraviolet ray-curable resin composition of the resin film was overlaid. Then, this coating liquid was dried and cured to form a light diffusion layer, i.e. to obtain a light diffusion sheet of No. 1. Table 1 shows the average height, the average diameter, the ratio of the average height to the average diameter, and the occupancy area ratio of the plurality of protruding portions of No. 1.

No. 2 to No. 6

Light diffusion sheets of No. 2 to No. 6 having similar structures to that of No. 1, except that the average height, the average diameter, the ratio of the average height to the average diameter, and the occupancy area ratio of the plurality of protruding portions were listed in Table 1, were produced by the production method similar to that of No. 1.

No. 7 to No. 13

Light diffusion sheets of No. 7 to No. 13 having similar structures to that of No. 1, except that the occupancy area ratio of the plurality of protruding portions were listed in Table 1, were produced by the production method similar to that of No. 1.

TABLE 1

| | Light diffusion sheet | | | |
|---|---|---|---|---|
| | Average height of protruding portions [μm] | Average diameter of protruding portions [μm] | Ratio of average height to average diameter of protruding portions [μm] | Occupancy area ratio of protruding portions [μm] |
| No.1 | 1.1 | 10.2 | 0.11 | 5 |
| No.2 | 0.5 | 3.5 | 0.14 | 5 |
| No.3 | 0.8 | 6.9 | 0.12 | 5 |
| No.4 | 5.0 | 53.8 | 0.09 | 5 |

TABLE 1-continued

| | Light diffusion sheet | | | |
|---|---|---|---|---|
| | Average height of protruding portions [μm] | Average diameter of protruding portions [μm] | Ratio of average height to average diameter of protruding portions [μm] | Occupancy area ratio of protruding portions [μm] |
| No.5 | 6.0 | 65.1 | 0.09 | 5 |
| No.6 | 10.0 | 109.8 | 0.09 | 5 |
| No.7 | 1.1 | 10.2 | 0.11 | 1 |
| No.8 | 1.1 | 10.2 | 0.11 | 2 |
| No.9 | 1.1 | 10.2 | 0.11 | 10 |
| No.10 | 1.1 | 10.2 | 0.11 | 30 |
| No.11 | 1.1 | 10.2 | 0.11 | 50 |
| No.12 | 1.1 | 10.2 | 0.11 | 80 |
| No.13 | 1.1 | 10.2 | 0.11 | 85 |

Stickiness

The light diffusion sheets of No. 1 to No. 13 were provided between a light guide film and a prism sheet, and then, a plurality of LED light sources were provided along an end face of this light guide film, to form an edge-lit backlight unit. A glass plate having a square of 20 mm×20 mm was provided on the front face of the prism sheet of this backlight unit, followed by pressing the front face of this glass plate with the pressure of 5 kgf. In this pressed state, rays of light were emitted from the plurality of LED light sources toward an end face of the light guide film. Furthermore, in this state of emitting rays of light, the pressing on the front face of the glass plate was released. In the pressed state and in the after-pressed state, the presence and absence of a bright spot from the front face side of the glass plate was observed, and evaluated with the following criteria. Table 2 shows the evaluation results.

A: Any bright spot was not observed either in the pressed state or in the after-pressed state;

B: A bright spot was observed in a region no greater than 30% of the front face of the glass plate only in the pressed state;

C: A bright spot was observed in a region greater than 30% of the front face of the glass plate only in the pressed state;

D: A bright spot was observed in a region greater than 30% of the front face of the glass plate in the pressed state, and a bright spot was observed for approximately several seconds also in the after-pressed state; and E: A bright spot was observed in a region greater than 30% of the front face of the glass plate in the pressed state, and a bright spot similar to that in the pressed state was observed persistently also in the after-pressed state.

Scuff Resistance

The light diffusion sheets of No. 1 to No. 13 were provided between a light guide film and a prism sheet, and a plurality of LED light sources were provided along one end face of this light guide film. Furthermore, a reflection sheet and an aluminum plate were provided in this order on the back face side of the light guide film, and then a liquid crystal panel was provided on the front face of the prism sheet. In this state, a 160-g spherical acrylic ball was dropped from the height position of 300 mm from the front face of the liquid crystal panel. Thereafter, rays of light were emitted from the plurality of LED light sources toward an end face of the light guide film, and, in the rays of light-emitted state and in the after rays of light-emitted state, the presence and absence of scuffs on the front face of the light guide film was observed, and evaluated with the following criteria. Table 2 shows the evaluation results.

A: Any scuff was not observed either in the rays of light-emitted state or in the after rays of light-emitted state;

B: Slightly white scuffs were observed only in the rays of light-emitted state;

C: Light white scuffs were observed only in the rays of light-emitted state, but the outlines of the scuffs seemed blurred;

D: Comparatively deep white scuffs were observed only in the rays of light-emitted state;

E: Scuffs were observed both in the rays of light-emitted state and in the after rays of light-emitted state.

TABLE 2

| | Stickiness | Scuff resistance |
|---|---|---|
| No.1 | A | A |
| No.2 | D | A |
| No.3 | C | A |
| No.4 | A | B |
| No.5 | A | D |
| No.6 | A | E |
| No.7 | D | A |
| No.8 | C | A |
| No.9 | A | A |
| No.10 | A | A |
| No.11 | B | C |
| No.12 | C | C |
| No.13 | D | E |

Evaluation Results

As shown in Table 1 and Table 2, it was found that the light diffusion sheet of No. 1 having the average height: 1.1 μm; the average diameter: 10.2 μm, and the ratio of the average height to the average diameter: 0.11 of the plurality of protruding portions could sufficiently prevent sticking with the light guide film, and scuffs on the light guide film were not produced. On the other hand, as No. 2 and No. 3 exhibit, in the aforementioned stickiness tests, a bright spot was observed as the average height and the average diameter of the plurality of protruding portions thereof became smaller than those of No. 1. This bright spot was caused since a sticking region between the light diffusion sheet and the light guide film became larger due to collapse of the protruding portions of the light diffusion sheet, etc., and the degree of transmission of rays of light in this sticking region became high. Furthermore, as No. 4 to No. 6 exhibit, it was found that, as the average height and the average diameter of the plurality of protruding portions increased more than those of No. 1, scuffs were likely to be produced on the front face of the light guide film due to the plurality of protruding portions.

Furthermore, as shown in Table 1 and Table 2, it was found that, with regard to the light diffusion sheets having the average height: 1.1 μm; the average diameter: 10.2 μm, and the ratio of the average height to the average diameter: 0.11 of the plurality of protruding portions, the light diffusion sheets of No. 1, No. 9, and No. 10 having the occupancy area ratio of the plurality of protruding portions of 5% to 30% could sufficiently prevent sticking with the light guide film, and scuffs on the light guide film were not produced. On the other hand, as No. 7 and No. 8 exhibit, it was found that, when the occupancy area ratio of the plurality of protruding portions is less than 2%, sticking of the light diffusion sheet and the light guide film was caused. It is inferred that the sticking was caused since the light diffusion sheet was likely to abut the light guide film on other part than the plurality of protruding portions. Furthermore, as No. 11 to No. 13 exhibit, it was found that, as the occupancy area ratio of the plurality of protruding portions is greater than 50%, the stickiness between the light diffusion sheet and the light guide film was increased. It is inferred that this deterioration was caused since, when the occupancy area ratio of the plurality of protruding portions became too high, the deterioration of the optical functions due to abutting parts of the plurality of protruding portions and the front face of the light guide film was likely to be caused. Furthermore, as No. 11 to No. 13 exhibit, it was found that, as the occupancy area ratio of the plurality of protruding portions is greater than 50%, the scuff resistance on the front face of the light guide film of the light diffusion sheet was deteriorated. It is inferred that this deterioration was caused since, when the abutting parts of the front face of the light guide film and the plurality of protruding portions increase excessively, scuffs due to the abutting parts of the plurality of protruding portions and the front face of the light guide film were likely to be produced.

INDUSTRIAL APPLICABILITY

As described above, according to the optical sheet of the embodiment of the present invention, the prevention of sticking is enabled, and the prevention of scuffs from being produced on other optical members disposed on the back face side is also enabled. Therefore, the optical sheet is suitable for use in various types of liquid crystal display devices such as a high-quality transmissive liquid crystal display device.

EXPLANATION OF THE REFERENCE SYMBOLS 1, 31 backlight unit for liquid crystal display device (backlight unit)
2 light guide film
3, 53, 63 light source
32 optical sheet for liquid crystal display device (optical sheet)
5, 41, 46 light diffusion sheet
6 prism sheet
7 reflection sheet
8 raised parts
9 recessed part
11, 16, 34 substrate layer
12 light diffusion layer
13a, 18a, 36a protruding part
14 beads
15 binder
17 prism array
17a protruding and streaking prism portion
21 production apparatus
22, 23 pressure roller
33 micro lens sheet
35 micro lens array
35a micro lens
13, 18, 36, 42, 52, 62 back layer
43, 47, 51, 61 diffraction grating shape
101 backlight unit
102 light source
103 optical waveguide sheet
104 optical sheet
105 light diffusion sheet
106 prism sheet
111 substrate layer
112 light diffusion layer
113 sticking preventive layer
114 beads
115 binder
A resin film

What is claimed is:

1. An optical sheet for a liquid crystal display device comprising a light incident face and a light exiting face that faces the light incident face, wherein
    a plurality of protruding portions are provided scatteredly on the light incident face of the optical sheet,
    the optical sheet comprises, on a light exiting face side, a light diffusion layer comprising a plurality of beads and a binder for the beads to form recessed and protruding shapes on a front face thereof,
    the protruding portions each have a spherical cap shape in which a ratio of a height to a diameter of a bottom face thereof is no greater than 0.5, or a conical shape with a rounded apex in which a ratio of a height to a diameter of a bottom face thereof is no greater than 0.5,
    an average diameter of the protruding portions is no less than 5 μm and no greater than 60 μm,
    a ratio of an average height to the average diameter of the protruding portions is no less than 0.02 and no greater than 0.2, and
    the protruding portions serve as both sticking preventive parts and light receiving parts.

2. The optical sheet for a liquid crystal display device according to claim 1, wherein the protruding portions each have a half spheroidal shape.

3. The optical sheet for a liquid crystal display device according to claim 1, wherein an occupancy area ratio of the plurality of protruding portions is no less than 2% and no greater than 80%.

4. The optical sheet for a liquid crystal display device according to claim 1, wherein the average height of the protruding portions is no less than 0.5 μm.

5. The optical sheet for a liquid crystal display device according to claim 1, wherein a diffraction grating shape with multiple rows that are oriented in a single direction is provided on the light incident face in a region where the plurality of protruding portions are absent.

6. The optical sheet for a liquid crystal display device according to claim 5, wherein the diffraction grating shape comprises scratch-like rows or hair-line-like rows arranged in a single direction.

7. The optical sheet for a liquid crystal display device according to claim 5, wherein a diffraction grating shape that is continuous with the diffraction grating shape is provided also on a light incident face side of the plurality of protruding portions.

8. A backlight unit for a liquid crystal display device comprising:
    an optical waveguide sheet that guides rays of light entering from an end face of the optical waveguide sheet toward a viewer's side thereof;
    one or more LED light sources provided along the end face of the optical waveguide sheet; and
    one or more optical sheets superposed on the viewer's side of the optical waveguide sheet;
    wherein the optical sheet according to claim 1 is used for at least one of the one or more optical sheets.

9. The backlight unit for a liquid crystal display device according to claim 8, wherein the light incident face of the optical sheet faces the optical waveguide sheet.

10. The optical sheet for a liquid display device according to claim 1, wherein the optical sheet is comprised in a backlight unit and wherein the backlight unit comprises an optical waveguide sheet and wherein the light incident face of the optical sheet faces the optical waveguide sheet.

11. The optical sheet for a liquid display device according to claim 1, wherein the optical sheet is comprised in a backlight unit and wherein the backlight unit comprises a reflection sheet and wherein the light incident face of the optical sheet faces the reflection sheet.

* * * * *